(12) United States Patent
Wu et al.

(10) Patent No.: US 8,531,141 B2
(45) Date of Patent: Sep. 10, 2013

(54) SYSTEM FOR CALIBRATING AN ELECTRICAL CONTROL SYSTEM

(75) Inventors: Long Wu, Fargo, ND (US); Robert Shaw, Moorhead, MN (US); Chris J. Tremel, West Fargo, ND (US); Kent D. Wanner, Fargo, ND (US)

(73) Assignee: Deere & Company, Moline, IL (US)

( * ) Notice: Subject to any disclaimer, the term of this patent is extended or adjusted under 35 U.S.C. 154(b) by 261 days.

(21) Appl. No.: 13/036,966

(22) Filed: Feb. 28, 2011

(65) Prior Publication Data
US 2012/0217915 A1 Aug. 30, 2012

(51) Int. Cl.
*H02P 6/16* (2006.01)

(52) U.S. Cl.
USPC ............. 318/400.07; 318/400.02; 318/400.14

(58) Field of Classification Search
USPC ................... 318/400.02, 400.07, 400.14, 721, 318/727, 808
See application file for complete search history.

(56) References Cited

U.S. PATENT DOCUMENTS

| | | | |
|---|---|---|---|
| 4,023,083 A | 5/1977 | Plunkett | |
| 4,453,116 A * | 6/1984 | Bose | 318/727 |
| 4,814,677 A | 3/1989 | Plunkett | |
| 5,053,688 A * | 10/1991 | Rees | 318/599 |
| 5,196,775 A | 3/1993 | Harris et al. | |
| 5,428,283 A | 6/1995 | Kalman | |
| 5,450,306 A * | 9/1995 | Garces et al. | 363/41 |
| 5,473,241 A | 12/1995 | Chen et al. | |
| 5,486,748 A | 1/1996 | Konrad | |
| 5,525,887 A | 6/1996 | Van Sistine | |
| 5,747,971 A * | 5/1998 | Rozman et al. | 322/10 |
| 5,914,582 A | 6/1999 | Takamoto | |
| 5,988,312 A | 11/1999 | Nishino et al. | |
| 6,043,995 A * | 3/2000 | Leuthen | 363/37 |
| 6,275,000 B1 | 8/2001 | Nishimura | |
| 6,388,416 B1 * | 5/2002 | Nakatani et al. | 318/700 |
| 6,549,871 B1 * | 4/2003 | Mir et al. | 702/145 |
| 6,605,918 B2 | 8/2003 | Mayhew et al. | |
| 7,045,988 B2 | 5/2006 | Ha | |
| 7,157,878 B2 | 1/2007 | Collier-Hallman | |

(Continued)

OTHER PUBLICATIONS

The International Search Report and the Written Opinion of the International Searching Authority, dated Apr. 18, 2013, (12 pages).

(Continued)

*Primary Examiner* — Paul Ip
(74) *Attorney, Agent, or Firm* — Brinks Hofer Gilson & Lione

(57) ABSTRACT

A method calibrates a current sensing instant to latch a current value from a set of current signals. A current command including a magnitude at a Gamma angle is provided to control a motor when the motor is operating in a motoring mode at a shaft speed. A matching current command including a same magnitude at a same Gamma angle is provided to control the motor when the motor is operating in a braking mode at a same shaft speed. A first actual averaging rms current magnitude of three phase currents of the motor is monitored when the motor is controlled by the current command and operating in the motoring mode. A second actual averaging rms current magnitude of the three phase currents of the motor is monitored when the motor is controlled by the matching current command and operating in the braking mode. A current sensing instant is adjusted until an observed first actual averaging rms current magnitude in the motoring mode equals an observed second actual averaging rms current magnitude in the braking mode.

23 Claims, 8 Drawing Sheets

(56) References Cited

U.S. PATENT DOCUMENTS

| | | | |
|---|---|---|---|
| 7,459,872 B2 * | 12/2008 | Woodland et al. | 318/605 |
| 7,733,044 B2 | 6/2010 | Nakamura et al. | |
| 8,076,895 B2 * | 12/2011 | Rouis | 318/721 |
| 8,084,986 B2 * | 12/2011 | Cheng et al. | 318/808 |
| 2006/0043923 A1 * | 3/2006 | Baker et al. | 318/807 |
| 2006/0247829 A1 | 11/2006 | Sato | |
| 2006/0279248 A1 * | 12/2006 | Borisavljevic | 318/723 |
| 2007/0046246 A1 * | 3/2007 | Borisavljevic | 318/723 |
| 2007/0296368 A1 * | 12/2007 | Woodland et al. | 318/609 |
| 2008/0079377 A1 | 4/2008 | Williams et al. | |
| 2009/0167221 A1 * | 7/2009 | Rouis | 318/400.14 |
| 2009/0174188 A1 | 7/2009 | Huang et al. | |
| 2009/0228224 A1 | 9/2009 | Spanier et al. | |
| 2010/0188033 A1 | 7/2010 | Daboussi | |
| 2011/0156632 A1 * | 6/2011 | Cheng et al. | 318/808 |

OTHER PUBLICATIONS

M. Elbuluk and M. Kankam, "Speed Sensorless Induction Motor Drives for Electrical Actuators: Schemes, Trends and Tradeoffs," National Aerospace and Electronics Conference cosponsored by IEEE, Wright-Patterson AFB Dayton, OH, Jul. 14-18, 1997, 10 pp.

S. Van Haute et al., "Design and Control of a Permanent Magnet Synchronous Motor Drive for a Hybrid Electric Vehicle," Katholieke University, Leauven, Belgium, 6 pp.

US 7,595,604, 09/2009, Tomigashi (withdrawn)

* cited by examiner

SYSTEM FOR CALIBRATING AN ELECTRICAL CONTROL SYSTEM

TECHNICAL FIELD

The present description relates generally to a system and method, generally referred to as a system, for calibrating an electrical control system.

BACKGROUND

Motors, such as alternating current machine like an interior permanent magnet (IPM) motor, a synchronous IPM machine (IPMSM), conventional induction machines, surface mounted PM machines (SMPM), other alternating current machines, or various other machines, may be controlled and/or powered in various ways. For example, motors may be powered using a battery, electricity, fossil fuels, motors, supply voltages, or other sources. Motors may be controlled manually and/or with the assistance of computer processors.

SUMMARY

A method calibrates a current sensing instant to latch a current value from a set of current signals. A current command including a magnitude at a Gamma angle is provided to control a motor when the motor is operating in a motoring mode at a shaft speed. A matching current command including a same magnitude at a same Gamma angle is provided to control the motor when the motor is operating in a braking mode at a same shaft speed. A first actual averaging rms current magnitude of three phase currents of the motor is monitored when the motor is controlled by the current command and operating in the motoring mode. A second actual averaging rms current magnitude of the three phase currents of the motor is monitored when the motor is controlled by the matching current command and operating in the braking mode. A current sensing instant is adjusted until an observed first actual averaging rms current magnitude in the motoring mode equals an observed second actual averaging rms current magnitude in the braking mode.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

Figure 1:
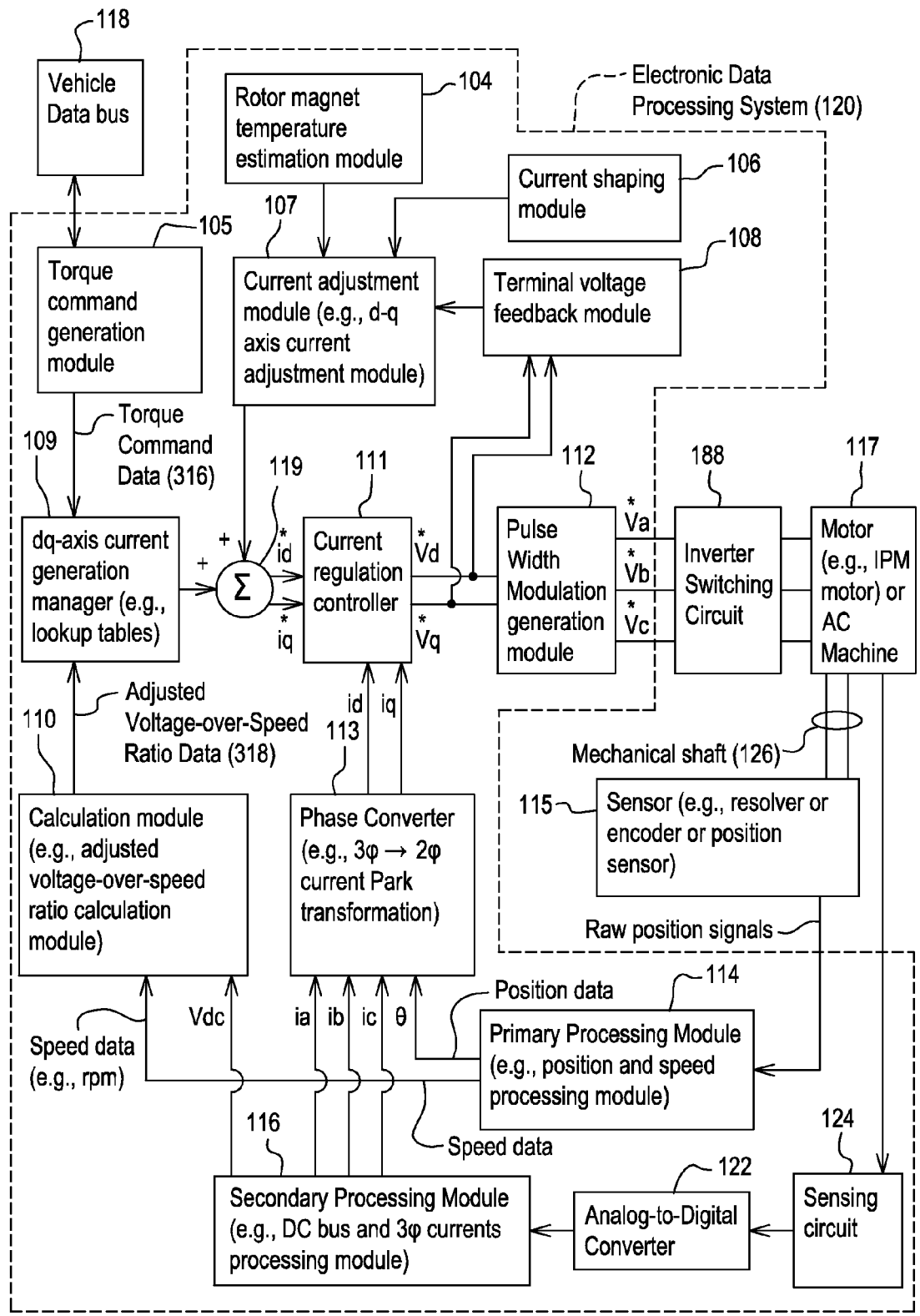
FIG. 1 is a block diagram a control system for controlling a motor.

In many motorized systems, precise control of the operation of motors may be desired, and in some situations, required. Precision control and operation of motors may require an understanding of the properties of the motor, as well as significant processing capabilities FIG. 1 illustrates a control system which may be used for controlling one or more motors, such as a motor 117. The control system may include one or more of an electronic data processing system 120, an inverter switching circuit 188, a sensor 115, and/or a vehicle data bus 118. More or less components or features may be included. The control system may refer to a combination of the electronic data processing system 120, the inverter switching circuit 188, and the sensor 115. In some systems, the control system may include the vehicle data bus 118. In other systems, the control system may only refer to the electronic data processing system 120 and/or the inverter switching circuit 188. The motor 117 and/or mechanical shaft 126 shown in FIG. 1 may or may not be considered a part of the control system. In some embodiments, the control system of FIG. 1, aside from the motor 117, may be referred to as an inverter or a motor controller.

The control system may be implemented and/or used to control one or more motors, such as, for example, a motor 117. The motor 117 may refer to various machines or motors, such as an alternating current machine like an interior permanent magnet (IPM) motor, a synchronous IPM machine (IPMSM), conventional induction machines, surface mounted PM machines (SMPM), other alternating current machines, or various other machines. In some embodiments, an IPMSM may have favorable advantages compared with conventional induction machines or surface mounted PM machines (SMPM) such as high efficiency, high power density, wide constant power operating region, and less maintenance, for instance. For simplicity, the controlled machine may be referred to as motor 117, but it should be appreciated that the disclosure is not limited to a motor.

Motor 117 may function and/or operate in various ways. For example, the motor 117 may be powered and/or controlled by a power supply. The power supply may, for example, be a voltage source (or source voltage) or a voltage supply (or supply voltage), such as a battery, electricity, bus voltage (such as direct current bus voltage), and/or other power, voltage, or current supplies.

The motor 117 may require, receive, be powered by, and/or operate based on a control signal. The control signal may, for example, be a current and/or voltage command, such as a three-phase current and/or voltage command. The control signal may physically power the motor 117, and/or may instruct the machine how to operate. The control signal may contain and/or deliver power from the power supply to the motor.

The control signal may, for example, be sent to the motor 117 by the inverter switching circuit 188, a generation module 112 such as a pulse width modulation generator, or other features or components. Other ways of operating and/or powering the motor 117 may be possible.

Motor 117 may be operable and/or function in various modes. For example, the motor 117 may be operable and/or function in a motoring mode. A motoring mode may refer to a mode where the motor 117 drives an attached mechanical shaft, such as mechanical shaft 126, or other device in a direction, with a speed, at an acceleration, and/or with a power. For example, a motoring mode may refer to a mode where the motor 117, attached to a larger machine such as a vehicle, drives, powers, propels, and/or accelerates the larger machine in a first direction. The motoring mode may refer to a mode where the motor 117 is consuming and/or receiving power from a power supply.

The motoring mode may be initiated by a command, such as a command from a user. For example, a user may instruct the control system and/or motor, though a user interface, to power the motor. An example of a user interface may be the controller 266 shown in FIG. 2 and discussed below. The control system may process the instruction and produce a signal and/or command to drive the motor.

Motor 117 may also operate in a braking mode, or a generating mode. A braking mode, or generating mode, may refer to a mode where the motor 117 is not driving and/or powering a machine. For example, a braking mode may exist or refer to where a motor 117 is running and no power signal and/or command is being sent to the motor 117. In the braking or generating mode, the motor 117 may be generating a charge and/or supplying electrical power and/or voltage to the power supply. For example, a rotating motor which may be idling may generate a signal and/or charge from its rotation which may be transmitted to the power source for the motor and/or control system, such as a dc bus voltage source. The braking mode may refer to a mode of operation where the motor is supplying power to the power source. In some systems, braking mode may refer to an operation of the motor 117 where the motor 117 and/or mechanical shaft 126 is rotated in an opposite direction than in the motoring mode.

In some embodiments, a distinction between a motoring mode and a braking mode is that a motoring mode refers to a period where a motor 117 is consuming power from the power supply, and the braking mode (or generation mode) may refer to where the motor 117 is feeding power back into the power supply. Other modes of operating the motor 117 are possible.

As mentioned and shown in FIG. 1, the motor 117 may be connected to, coupled with, and/or in communication with the inverter switching circuit 188.

The inverter switching circuit 188 may receive command signals from the electronic data processing system 120, such as from the generation module 112. For example, the generation module 112 may provide inputs to a driver stage within the inverter circuit 188. Such command signals may be generated, and/or transmitted by the generation module 112 to the inverter switching circuit 188 to be processed and sent to the motor 117 for controlling and/or driving the motor 117. In some systems, such commands may be referred to as voltage commands, or three phase voltage commands.

The inverter switching circuit 188 may be powered by a power supply. In some configurations, the inverter switching circuit 188 and/or the power supply to the inverter switching circuit 188 may be considered the power supply for the motor 117. In some configurations, the power supply may be a direct current (DC) voltage bus. The power supply may alternatively be a voltage source (or source voltage) or a voltage supply (or supply voltage), such as a battery, electricity, another bus voltage, and/or other power, voltage, or current supplies. Other power supplies and configuration are possible.

The inverter switching circuit 188 may include power electronics, such as switching semiconductors, which may function and/or be used to generate, modify and/or control pulse-width modulated signals or other alternating current signals, such as pulse, square wave, sinusoidal, or other waveforms. The inverter switching circuit 188 may include a semiconductor drive circuit that drives or controls switching semiconductors (e.g., insulated gate bipolar transistors (IGBT) or other power transistors) to output the generated and/or modified control signals to the motor 117.

As mentioned, the inverter switching circuit 188 may receive a voltage command, or other command signal, from a generation module 112. The inverter switching circuit 188 may provide voltage, current, and/or power signals or commands based on the received command signals to the motor 117. For example, the inverter switching circuit 188 may receive commands and/or command signals from the generation module 112, may transform supply voltage supplied to and/or fed to the inverter switching circuit 188 into a voltage command and/or voltage signal, and/or may transmit or otherwise send the voltage command and/or voltage signal to the motor 117. The command and/or signal generated by the inverter switching circuit 188 may be, and/or may also be referred to as, a voltage command, a terminal voltage command, or a dq-axis voltage command.

Control signals or commands provided by the inverter switching circuit 188 to the motor 117 may control and/or drive the motor 117. For example, an output stage, port, or transmission of the inverter switching circuit 188 may provide and/or transmit a pulse-width modulated voltage waveform or other voltage signal for control of the motor. Control signals and/or commands provided by the inverter switching circuit 188 to the motor 117 may or may not be based on and/or related to the command signals received by the inverter switching circuit 188 from the generation module 112.

The motor 117 may be attached to, connected with, and/or in communication with a mechanical shaft 126. The mechanical shaft 126 may be configured and/or attached to the motor 117 such that when the motor 117 is running, the mechanical shaft 126 may rotate or otherwise be displaced. As an example, a motor 117 may drive a rotation of the mechanical shaft 126. In this way, an object attached to an end of the mechanical shaft, such as a wheel, may be rotated by the motor 117. The mechanical shaft 126 may be a motor shaft, or various other shafts.

The mechanical shaft 126 may be various shapes, sizes, and/or dimensions, and may be made of various materials. For example, a mechanical shaft 126 may be any mechanical shaft configured and/or capable of being used with a motor 117, such as a shaft in a vehicle attached to a vehicle motor. Other mechanical shafts may be possible.

The motor 117 may also be associated with a sensor 115. The sensor 115 may be, and/or may include a position sensor, a brushless resolver, another resolver, an encoder position sensor, a speed sensor, a shaft or rotor speed detector, a digital position encoder, a direct current motor, an optical encoder, a magnetic field sensor such as a Hall Effect sensor, a magneto-resistive sensor, or various combination of sensors, encoders, or encoders. An output of the sensor may include analog signals, digital signals, or both. Other sensors may be possible.

Sensor 115 may be connected, attached to, and/or in communication with the mechanical shaft 126 and/or the motor 117. For example, the sensor 115 may be mounted on or integral with the mechanical shaft 126. This may be useful in systems where a rotation or displacement of the mechanical shaft can be easily and/or directly correlated with one or more properties of the motor 117. Alternatively, the sensor 115 may be connected directly to the motor and/or other components attached to or in communication with the motor. In addition, more than one sensor 115 may be used in some systems. For example, one sensor 115 may be used to sense data for each phase of a three phase motor. Various configurations are possible.

The sensor 115 may be used to monitor, measure, and/or estimate one or more properties of the motor 117 and/or the mechanical shaft 126. Where the sensor 115 is connected or attached to the mechanical shaft, the sensor 115 may, for example, monitor, measure, and/or estimate properties of the mechanical shaft 126, such as an angular position of the mechanical shaft 126, a speed or velocity of the mechanical shaft 126, and/or a direction of rotation of the mechanical shaft 126. Alternatively, the sensor 115 may measure one or more properties of a motor 117 directly, such as, for example, an angular position of the motor 117, a speed or velocity of the motor 117, and/or a direction of rotation of the motor 117.

In some configurations, the sensor 115 includes a position sensor, where position data and associated time data are processed to determine speed or velocity data for the mechanical shaft 126. In other configurations, the sensor 115 may include a speed sensor, or the combination of a speed sensor and an integrator to determine the position of the motor shaft. In other configurations, the sensor 115 may include an auxiliary, compact direct current generator that is coupled mechanically to the mechanical shaft 126 of the motor 117 to determine speed of the motor shaft 126. In these configurations, the direct current generator may produce an output voltage proportional to the rotational speed of the motor shaft 126. In other configurations, the sensor 115 may include an optical encoder with an optical source that transmits a signal toward a rotating object coupled to the mechanical shaft 126 and receives a reflected or diffracted signal at an optical detector. In these configurations, the frequency of received signal pulses (e.g., square waves) may be proportional to a speed of the mechanical shaft 126. In other configurations, the sensor 115 may include a resolver with a first winding and a second winding, where the first winding is fed with an alternating (AC) current, where the voltage induced in the second winding varies with the frequency of rotation of the rotor. Various other configurations are possible.

The sensor 115 may output a signal based on properties and/or signals monitored, measured, and/or estimated from the attachment or connection to the mechanical shaft 126 and/or the motor 117. The output of the sensor 115 may include feedback data such as current feedback data like $i_a$, $i_b$, $i_c$, raw signals, such as raw position or velocity signals, or other feedback or raw data. Other possible feedback data includes, but is not limited to, winding temperature readings, semiconductor temperature readings of the inverter circuit 188, three phase voltage or current data, or other thermal or performance information for the motor 117. Alternatively or in addition, the output of the sensor 115 may include processed signals. The output of the sensor 115 may be an analog or digital signal.

In some embodiments, the sensor 115 may be coupled to an analog-to-digital converter (not shown) that may convert analog position data or velocity data to digital position or velocity data respectively. Such an analog-to-digital converter may be internal or external to the control system and/or electronic data processing system 120. In other embodiments, the sensor 115 may provide a digital data output of position data or velocity data, such as position data or velocity data for the mechanical shaft 126 or the rotor.

The output of a sensor 115 may be transmitted, sent, passed, and/or otherwise communicated to the electronic data processing system 120. In some systems, the output may be coupled to the primary processing module 114 of the electronic data processing system 120. In embodiments where the sensor 115 is coupled to an analog-to-digital converter (not shown), the output of the analog-to-digital converter may be transmitted, sent, passed, and/or otherwise communicated to the primary processing module 114.

The control system may include an electronic data processing system 120. The electronic data processing system 120 is indicated by the dashed lines in FIG. 1 and is shown in greater detail in FIG. 2.

The electronic data processing system 120 may be used to support storing, processing or execution of software instructions of one or more software modules. The electronic data processing system 120 may include electronic modules, software modules, hardware modules, or combinations of each.

The electronic data processing system 120 may include one or more elements, features, and/or components, such as a sensing circuit 124, an analog-to-digital converter 122, a primary processing module 114, a secondary processing module 116, a phase converter 113, a calculation module 110, a dq-axis current generation manager 109, a summer or summation module 119, a current shaping module 106, a rotor magnet temperature estimation module 104, a terminal voltage feedback module 108, a current adjustment module 107, a torque command generation module 105, a current regulation controller 111, and/or a generation module 112. The electronic data processing system may also or alternatively include a digital processing system and/or a field-programmable gate array. One or more of the components of the electronic data processing system 120 may be combined into each other, and/or may be divided among other components. For example, in some systems, the sensing circuit 124 and the analog-to-digital converter 122 may be external to the electronic data processing system 120. More or less components may be included with the electronic data processing system 120. In some embodiments, the electronic data processing system 120 of FIG. 1 may represent more than one electronic data processing system, some or all of which may be connected, attached, and/or in communication with each other.

As mentioned, an output of the sensor 115 may be sent, transmitted, and/or otherwise communicated to the electronic data processing system 120. For example, an output of the sensor 115 may be sent to the primary processing module 114.

The primary processing module 114, which may be a position and/or speed processing module, may process the output from the sensor 115. The primary processing module 114 may process, determine, calculate, estimate, and/or otherwise identify position data (θ) and/or speed data for the motor 117. In some systems, the sensor 115 on the motor 117 may provide position data (θ) for the motor shaft 126, and the primary processing module 114 may convert the position data from the sensor 115 into speed data.

The position data (θ) for the motor 117 may refer to a position of the mechanical shaft 126 and/or a position of the motor 117. The position data (θ) may be expressed as and/or represent an angle, an offset angle, a phase, or various other angles or positions. The speed data may refer to a speed of the motor 117. The speed data may be expressed as, and/or refer to, revolutions per minute of the mechanical shaft 126, or may be expressed and/or refer to various other speeds. The position data (θ) and/or speed data may be processed, determined, calculated, estimated, and/or otherwise identified by the primary processing module 114 based on, or as a result of, the output received by the primary processing module 114 from the sensor 115.

The primary processing module 114 may output the position data (θ) and/or the speed data to one or more components of the control system. For example, the primary processing module 114 may output the position data (θ) to the phase converter 113, and/or may output the speed data to the calculation module 110. Alternatively the primary processing module 114 may output one or both of the position data (θ) and/or speed data for the motor 117 to various other components of the control system.

In addition to the sensor 115 previously described, the control system may also include a sensing circuit 124. The sensing circuit 124 may have inputs which may be coupled to the motor 117. The inputs of the sensing circuit 124 may be used for and/or operable to monitor, measure, and/or estimate properties of the motor 117. For example, the inputs of the sensing circuit 124 may be coupled to terminals of the motor 117. The input of the sensing circuit 124 may be used to sense a measured current of the motor 117. For example, the sensing circuit 124 may be associated with the motor 117 for measuring three phase currents, such as a current applied to the windings of the motor 117, back EMF induced into the windings, or both. The sensing circuit 124 may also, or alternatively, be used to measure a voltage level of the motor 117, such as a direct current voltage level of the motor 117. Alternatively or in addition, the sensing circuit 124 may be used to measure a voltage supply level used to power the motor 117 and/or used to power the inverter switching circuit 188, such as a high voltage DC data bus which provides DC power to the inverter switching circuit 188. Other configurations are possible. Additionally, other properties of the motor 117 may be monitored, measured, and/or estimated.

The sensing circuit 124 is shown in FIG. 1 as being a part of the electronic data processing system 120. Alternatively, the sensing circuit 124 may be a component separate from the electronic data processing system 120, and/or may be externally attached, connected, and/or in communication with the electronic data processing system 120.

The sensing circuit 124 may transmit and/or output signals sensed from the motor 117 to an analog-to-digital converter 122 in the electronic data processing system 120. These signals may, for example, include measured three phase currents and/or a voltage level of a power supply, such as the direct current (DC) data bus voltage powering the inverter switching circuit 188.

The analog-to-digital converter 122 is shown in FIG. 1 as being a part of the electronic data processing system 120. Alternatively, the analog-to-digital converter 122 may be a component separate from the electronic data processing system 120, and/or may be externally attached, connected, and/or in communication with the electronic data processing system 120.

The analog-to-digital converter 122 may receive an output of the sensing circuit 124. The analog-to-digital converter 122 may transform and/or digitize an analog output from the sensing circuit 124 into a digital signal which may then be further processed by the electronic data processing system 120.

The analog-to-digital converter 122 may be attached, connected, coupled to, and/or in communication with the secondary processing module 116. An output from the analog-to-digital converter 122, such as the digitized output from the sensing circuit 124, may be transmitted to the secondary processing module 116.

In some systems, the analog-to-digital converter 122 may not be necessary or included. For example, in systems where an output of the sensing circuit 124 is a digital signal, an analog-to-digital converter 122 may not be useful.

The secondary processing module 116, which may in some systems be referred to as a "direct current (DC) bus and three phase current processing module," may process, determine, calculate, estimate, or otherwise identify information from the signals received from the analog-to-digital converter 122. For example, the secondary processing module 116 may determine or identify three phase currents ($i_a$, $i_b$, $i_c$) from the signal received from the sensing circuit 124. These three phase currents ($i_a$, $i_b$, $i_c$) may represent and/or relate to the actual three phase currents generated by the motor 117. Alternatively or in addition, the secondary processing module 116 may determine or identify the direct current (DC) data bus voltage powering the inverter switching circuit 188.

The secondary processing module 116 may include one or more digital signal processors, field programmable gate arrays, other processors, and/or various other components. In addition or alternatively, the secondary processing module 116 may be included in one or more digital signal processors, field programmable gate arrays, other processors, and/or various other components.

The secondary processing module 116 may output the three phase currents ($i_a$, $i_b$, $i_c$) and/or direct current voltage to one or more components of the control system and/or electronic data processing system 120. For example, the secondary processing module 116 may output each of the three phase currents ($i_a$, $i_b$, $i_c$) to the phase converter 113, and may output the direct current voltage ($V_{DC}$) to the calculation module 110. Alternatively the secondary processing module 116 may output one or both of the three phase currents ($i_a$, $i_b$, $i_c$) and/or direct current voltage ($V_{DC}$) to various other components of the control system.

The phase converter 113, which may in some systems be referred to as a three-phase to two-phase current Park transformation module, may receive outputs from one or both of the primary processing module 114 and the secondary processing module 116. For example, as in FIG. 1, the phase converter may receive the three phase currents ($i_a$, $i_b$, $i_c$) of the motor from the secondary processing module 116, as well as position data (θ) from the primary processing module 114. Other inputs are possible.

The phase converter 113 may convert the three phase currents ($i_a$, $i_b$, $i_c$) and position data (θ) from a three phase digital representation of measured current in the motor 117 into a corresponding two phase digital representation of the measured current. The two phase representation of the digital current may be a current signal represented in a dq-axis, and/or may have a d-axis current component and a q-axis current component. For example, the phase converter 113 may apply a Park transformation or other conversion equations to convert the measured three-phase representations of current ($i_a$, $i_b$, $i_c$) into two-phase representations of current ($i_d$, $i_q$) using the current data from the secondary processing module 116 and the position data from the primary processing module 114 and/or sensor 115.

The two phase representation of current ($i_d$, $i_q$) may be d-q axis current, and may refer to a direct axis current ($i_d$) and a quadrature axis current ($i_q$), as applicable in the context of vector-controlled alternating current machines, such as the motor 117.

The two-phase current ($i_d$, $i_q$) may be output from the phase converter 113 module another component of the control system and/or electronic data processing system 120, such as the current regulation controller 111. Other outputs from the phase converter 113 are possible, and may be output to other components of the control system and/or electronic data processing system 120.

The phase converter 113 may include one or more digital signal processors, field programmable gate arrays, other processors, and/or various other components. In addition or alternatively, the phase converter 113 may be included in one or more digital signal processors, field programmable gate arrays, other processors, and/or various other components. For example, in some system, the phase converter 113 and the secondary processing system 116, or the functionality of the phase converter 113 and/or the secondary processing system 116, may be included in a combination of a digital signal processor and a field programmable gate array. Other configurations may be possible.

The electronic data processing system 120 may include a calculation module 110. The calculation module 110 may receive outputs from the primary processing module 114 and the secondary processing module 116. For example, the primary processing module 114 may provide speed data (such as the revolutions per minute of the mechanical shaft 126). Additionally or alternatively, the secondary processing module 116 may provide a measured level of direct current voltage.

The calculation module 110 may process, determine, calculate, estimate, or otherwise identify a voltage-over-speed ratio, or other data, from the received outputs of the processing module 114 and/or the secondary processing module 116. For example, the calculation module 110 may divide the received direct current voltage by the received speed data to determine a voltage-over-speed ratio, such as the adjusted voltage-over-speed ratio 318. Other calculations or comparisons are possible.

Additionally, the direct current voltage level of the power supply that supplies the inverter circuit 188 with electrical energy may fluctuate or vary because of various factors, including, but not limited to, ambient temperature, battery condition, battery charge state, battery resistance or reactance, fuel cell state (if applicable), motor load conditions, respective motor torque and corresponding operational speed, and vehicle electrical loads (e.g., electrically driven air-conditioning compressor). The calculation module 110 may adjust and/or impact current commands generated by the d-q axis current generation manager 109 to compensate for fluctuation or variation in the direct current bus voltage, among other things. Such adjustments may be made, implemented, and/or reflected in an adjusted voltage-over-speed ratio 318.

One or more outputs of the calculation module 110 may be transmitted, output, fed, sent, and/or otherwise communicated to the dq-axis current generation manager 109.

The torque command generation module 105 may also, or alternatively, be attached, connected, coupled, and/or otherwise in communication with the dq-axis current generation manager 109.

The torque command generation module 105 may itself receive an input, such as an input from the vehicle data bus 118. The vehicle data bus 118 may, for example, be a controller area network (CAN) or other network. The vehicle data bus may in some systems include wired networks, wireless networks, or combinations thereof. Further, the network may be a public network, such as the Internet, a private network, such as an intranet, or combinations thereof, and may utilize a variety of networking protocols now available or later developed including, but not limited to TCP/IP based networking protocols.

The torque command generation module 105 may take the received signal or torque command from the vehicle data bus 118, and may calculate, identify, estimate, and/or generate torque command data 316 based on the received signal. For example, where the received signal indicates that an acceleration pedal has been pressed, the torque command generation module 105 may generate a command and/or torque command data 316 for increased torque and/or power to be sent to the motor 117. Other received signals and commands are possible.

The torque command generation module 105 may include a lookup table which the torque command generation module 105 may use to compare and/or look up an input command received by the torque command generation module 105 to identify and/or generate the resulting torque command data 316 in response to the received input command. In other systems, the torque command generation module 105 may process the received input, and may output the processed signal to the dq-axis current generation manager 109, without using or referring to a lookup table, such as by using one or more algorithms and/or rules based logic.

The torque command generation module 105 may be output, transmitted, and/or otherwise communicated to the dq-axis current generation manager 109.

The dq-axis current generation manager 109, which may also be referred to and/or include dq-axis current generation look-up tables, may receive the torque command data 316 from the torque command generation module 105. The dq-axis current generation manager 109 may also or alternatively receive adjusted voltage-over-speed ratio data 318 from the calculation module 110.

The dq-axis current generation manager 109 may use the received torque command data 316 and/or voltage-over-speed data 318 to look up, determine, select, and/or generate direct axis current command data (such as a d-axis current command ($i_d$*)) and/or quadrature axis current command data (such as a q-axis current command ($i_q$*)). For example, the dq-axis current generation manager 109 may select and/or determine the direct axis current command and the quadrature axis current command by accessing one or more of the following: (1) a look-up table, database or other data structure that relates respective torque command data 316 and/or adjusted voltage-over-speed data 318 to corresponding direct and quadrature axes currents ($i_d$*, $i_q$*), (2) a set of quadratic equations or linear equations that relate respective torque command data 316 and/or adjusted voltage-over-speed data 318 to corresponding direct and quadrature axes currents ($i_d$*, $i_q$*), and/or (3) a set of rules (such as if-then rules) and/or logic that relate respective torque command data 316 and/or adjusted voltages-over-speed data 318 to corresponding direct and quadrature axes currents ($i_d$*, $i_q$*). Where the dq-axis current generation module 109 uses a lookup table, the lookup table may be a part of the dq-axis current generation module 109, and/or may be accessible to the dq-axis current generation module 109. The lookup table may, for example, be a three dimensional lookup table.

The output of the dq-axis current generation manager 109 may be sent, fed, transmitted, and/or otherwise communicated to a summer 119. While FIG. 1 shows a system with a summer 119 which may sum an output of the dq-axis current generation manager 109 and an output of the current adjustment module 107, in other systems where the current adjustment module 107 and/or feedback controls are not desired, required, or enabled, the output from the current generation manager 109 may be fed directly to the current regulation controller 111.

An output of the current adjustment module 107 may reflect one or more adjustment factors, such as one or more adjustment factors or commands determined and/or transmitted the rotor magnet temperature estimation module 104, the current shaping module 106, and/or the terminal voltage feedback module 108.

The rotor magnet temperature estimation module 104 may be connected to, attached to, in communication with, coupled to, monitor, or otherwise estimate or determine the temperature of one or more components of the motor 117. For example, the rotor magnet temperature estimation module 104 may estimate or determine the temperature of a rotor permanent magnet or magnets.

For example, in some embodiments, the rotor magnet temperature estimation module 104 may estimate the temperature of the rotor magnets from one or more sensors located on the stator, in thermal communication with the stator, or secured to the housing of the motor 117. In other embodiments, the rotor magnet temperature estimation module 104 may be replaced with a temperature detector (e.g., a thermistor and wireless transmitter like infrared thermal sensor) mounted on the rotor or the magnet, where the detector may provide a signal, such as a wireless signal, which may be indicative of the temperature of the magnet or magnets.

In response to and/or based on a measured temperature and/or estimated change in rotor temperature, the rotor magnet temperature estimation module 104 may generate an adjustment of the q-axis current command and/or the d-axis current command. The adjustment may be in the form of an adjustment current command, an adjustment signal, adjustment factor, and/or adjustment data to be sent to the current adjustment module 107. The adjustment may be sent, fed, transmitted, and/or otherwise communicated to the current adjustment module 107.

Alternatively or additionally, the system may include a current shaping module 106. The current shaping module 106 may, for example, measure, calculate, estimate, monitor, and/or otherwise identify one or more factors or features of the motor 117. For example, the current shaping module 106 may identify a torque load on the motor 117 and/or a speed of the motor 117. Other factors and/or features are possible.

The current shaping module 106 may determine a correction or adjustment of the quadrature axis (q-axis) current command and the direct axis (d-axis) current command based on one or more of the factors or features, such as the torque load on the motor 117 and speed of the motor 117. The correction and/or adjustment may be in the form of an adjustment current command, an adjustment signal, adjustment factor, and/or adjustment data to be sent to the current adjustment module 107. This correction and/or adjustment may be sent, fed, transmitted, and/or otherwise communicated to the current adjustment module 107.

Alternatively or additionally, the system may include a terminal voltage feedback module 108. The terminal voltage feedback module 108 may, for example, calculate a voltage supply limit, such as by sampling the voltage supply magnitude each PWM cycle, and applying a limit coefficient to the voltage supply, such as $1/\sqrt{3}$, or $0.95/\sqrt{3}$, or other coefficients. The terminal voltage feedback module 108 may also sample the terminal voltage command from the current regulation controller 111. The terminal voltage feedback module 108 may compare the terminal voltage command to the voltage limit, and may generate an adjustment command to be sent to the command generation module 107, whenever the terminal voltage command is greater than the voltage limit. This adjustment command may, for example, be a d-axis current adjustment command, and may be intended to reduce the terminal voltage command generated by the current regulation controller 111.

The correction and/or adjustment may be in the form of an adjustment current command, an adjustment signal, an adjustment factor, and/or adjustment data to be sent to the current adjustment module 107. The adjustment command from the terminal voltage feedback module 108 may be sent, fed, transmitted, and/or otherwise communicated to the current adjustment module 107.

As mentioned, one or more of the rotor magnet temperature estimation module 104, the current shaping module 106, and the terminal voltage feedback module 108 may be coupled to and/or are capable of communicating with the dq-axis current adjustment module 107.

The current adjustment module 107 may gather the adjustment signals, adjustment factors, adjustment commands, and/or adjustment data from one or more of the rotor magnet temperature estimation module 104, the current shaping module 106, and the terminal voltage feedback module 108. The current adjustment module 107 may add, aggregate, assimilate, compile, and/or otherwise account for the adjustment data and/or commands from each of the rotor magnet temperature estimation module 104, the current shaping module 106, and the terminal voltage feedback module 108, and using this data, may generate and/or create a complete or total adjustment command. Where the gathered adjustment data includes adjustment commands, the current adjustment module 107 may aggregate, sum, and/or combine the adjustment commands together to form one adjustment command. In other circumstances, the current adjustment module 107 may need to further process the adjustment commands to obtain a signal which may be summed at the summation block 119. This complete or total adjustment command may also be referred to, for example, as an adjustment command, an adjusted d-axis current command, a d-axis current adjustment command, or a d-axis current adjustment.

The current adjustment module 107 may provide this d-axis current adjustment data, such as the adjusted d-axis current command, to adjust the direct axis current command data based on input data from the rotor magnet temperature estimation module 104, the current shaping module 106, and terminal voltage feedback module 108.

In turn, the current adjustment module 107 may communicate with the dq-axis current generation manager 109 or the summer 119. For example, the current adjustment module 107 may send, feed, transmit, and/or otherwise communicate the d-axis current adjustment command to the summer 119, which may add the d-axis current adjustment command together with an output from the dq-axis current generation manager 109.

While FIG. 1 shows each of the rotor magnet temperature estimation module 104, the current shaping module 106, and the terminal voltage feedback module 108 as being connected to the current adjustment module 107, and one output from the current adjustment module 107 being fed to the summation block 119, other configurations are possible. For example, where the rotor magnet temperature estimation module 104 and the current shaping module 106 are not included or are disabled, an output from the terminal voltage feedback module 108 may be transmitted directly to the summer 119. Various other configurations are possible.

The summer 119, which in some systems may be referred to as a summation block or summation module, may receive the dq-current command from the dq-axis current generation manager 109. The summer 119 may also or alternatively receive the d-axis current adjustment command from the current adjustment module 107. The summer 119 may add the d-axis current adjustment command to the dq-current command, and may output an adjusted current command. The adjusted current command may be represented as a two-phase current command ($i_d^*$, $i_q^*$).

While FIG. 1 depicts the dq-axis current adjustment command being transmitted to the summer 119, in some systems, the dq-axis current adjustment command may be transmitted directly to the dq-axis current generation manager 109, and/or may be used by the dq-axis current generation manager to select a proper current command to be used in controlling and/or powering the motor 117.

The adjusted current command from the summer 119 may be sent, fed, transmitted, and/or otherwise communicated to the current regulation controller 111. As mentioned, the current regulation controller 111 may also receive the actual two-phase currents ($i_d$, $i_q$) from the phase converter 113.

The current regulation controller 111 may process the respective dq-axis current commands (e.g., $i_d^*$ and $i_q^*$) and actual dq-axis currents (e.g., $i_d$ and $i_q$) received, and may output one or more corresponding dq-axis voltage commands (e.g., $v_d^*$ and $v_q^*$ commands) based on the processed inputs. These dq-axis voltage commands ($v_d^*$, $v_q^*$) may be two-phase voltage commands, and may be sent, fed, transmitted, and/or otherwise communicated to the generation module 112.

The generation module 112, which may be a pulse-width modulation (PWM) generation module, such as a space vector PWM generation module, may receive the voltage commands, such as the two-phase voltage commands ($v_d^*$, $v_q^*$), from the current regulation controller 111. The generation module may generate a three phase voltage command based on the received terminal voltage command. For example, the generation module 112 may convert the direct axis voltage and quadrature axis voltage commands ($v_d^*$, $v_q^*$) from two phase data representations into three phase representations, such as $v_a^*$, $v_b^*$ and $v_c^*$. The three phase representations $v_a^*$, $v_b^*$ and $v_c^*$ may, in some systems, represent a desired voltage to control the motor 117.

The three phase voltage command representations ($v_a^*$, $v_b^*$, and $v_c^*$) may be transmitted, fed, sent, and/or communicated to the inverter switching circuit 188. The inverter switching circuit 188 may generate the three phase voltage commands for controlling the motor 117. The three phase voltage commands may be based on the three phase voltage command signals ($v_a^*$, $v_b^*$, and $v_c^*$) received from the generation module 112. In at least this way, the control system may be operated to control the motor 117.

In some systems and/or embodiments, the generation module 112 may be powered by the same power supply previously discussed with respect to the inverter switching circuit 188. In some systems, the generation module 112 and the inverter switching circuit 188 may be part of the same component, and may receive the two phase voltage command from the current regulation controller 111 and may output a three phase voltage command to the motor 117 to drive the motor 117.

Figure 2:
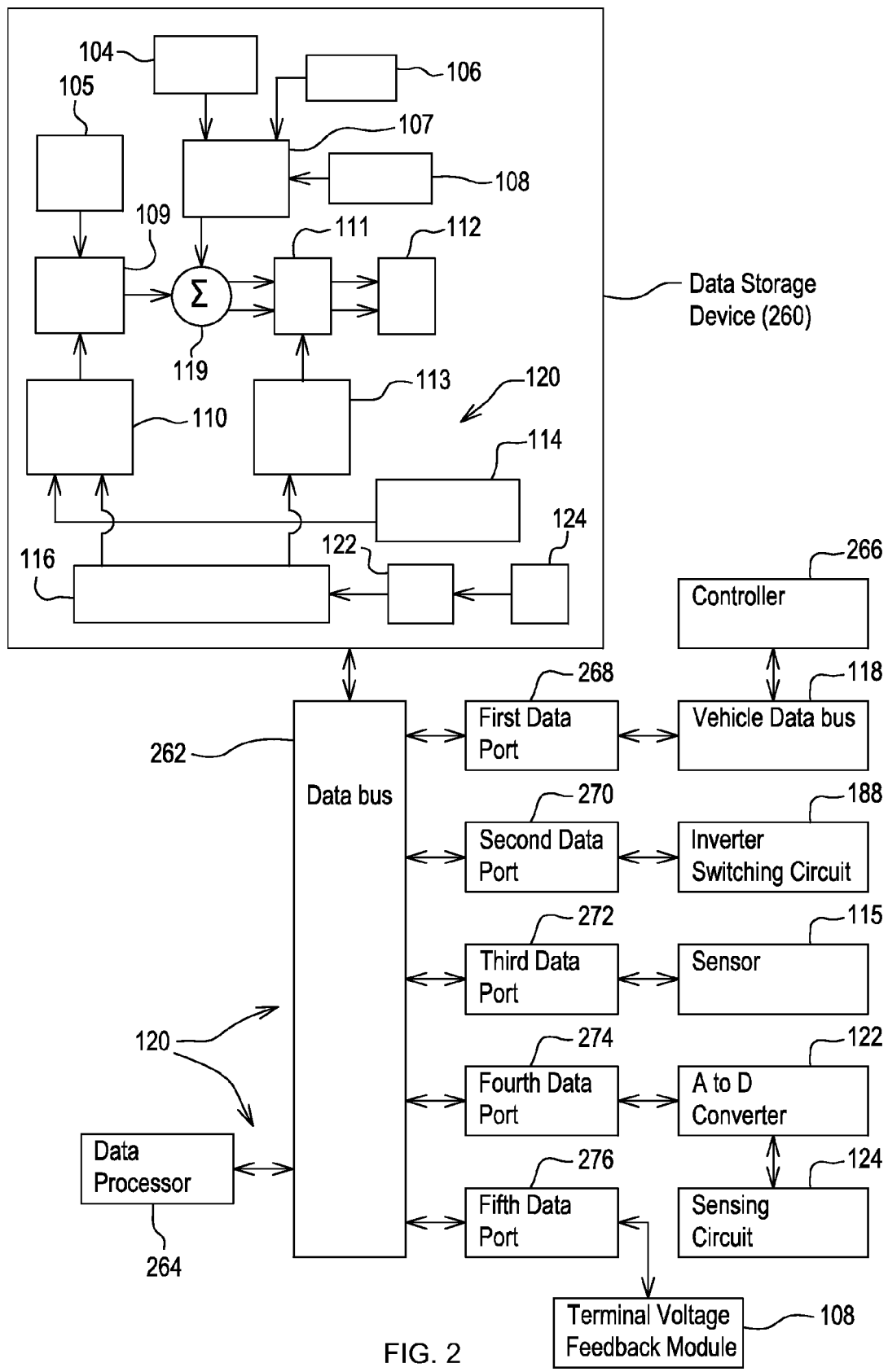
FIG. 2 is a block diagram of an electronic data processing system useful with a control system for controlling a motor.

FIG. 2 illustrates an example of the control system. The control system of FIG. 2 may include an electronic data processor 264, a data bus 262, a data storage device 260, and one or more data ports (268, 270, 272, 274 and 276). The control system of FIG. 2 may include all or part of the electronic data processing system 120 of FIG. 1. The data processor 264, the data storage device 260 and one or more data ports may be coupled to the data bus 262 to support communications of data between or among the data processor 264, the data storage device 260 and one or more data ports. Like numbered components in FIG. 2 may be constructed and/or function in the same or similar manner as the same components in FIG. 1.

The control system, the electronic data processing system 120 and/or various components of the electronic data processing system 120 may be or may include one or more computing devices of various kinds, such as a computer system. The computer system can include a set of instructions that can be executed to cause the computer system to perform any one or more of the methods or computer based functions disclosed herein. The computer system may operate as a standalone device or may be connected, e.g., using a network, to other computer systems or peripheral devices. The computer system may include computers, processor, and/or other programmable apparatus. Actions of the computers, processor, and/or other programmable apparatus may be directed by computer programs, applications and/or other forms of software. Memory in, used with, or used by the control system, such as computer-readable memory, may be used to direct the computers, processor, and/or other programmable apparatus to function in a particular manner when used by the computers, processor, and/or other programmable apparatus. Methods of controlling motors, such as described by flowcharts herein, may be performed as a series of operational steps on or with the aid of the computers, processor, and/or other programmable apparatus.

In a networked deployment, the computer system may operate in the capacity of a server or as a client user computer in a server-client user network environment. The computer system may include a processor, e.g., a central processing unit (CPU), a graphics processing unit (GPU), or both. For example, the control system and/or electronic data processing system 120 may include the data processor 264 shown in FIG. 2.

The data processor 264 may be a component in a variety of systems. For example, the processor may be part of a standard personal computer or a workstation. The processor may be one or more general processors, digital signal processors, application specific integrated circuits, field programmable gate arrays, servers, networks, digital circuits, analog circuits, combinations thereof, or other now known or later developed devices for analyzing and processing data. The data processor 264 may include one or more of an electronic data processor, a microprocessor, a microcontroller, a programmable logic array, a logic circuit, an arithmetic logic unit, an application specific integrated circuit, a digital signal processor, a proportional-integral-derivative (PID) controller, or another data processing device. The processor may implement a software program, such as code generated manually (i.e., programmed).

The data processor 264 may be coupled to the electronic data processing system 120, one or more of the ports 268, 270, 272, 274, and 276, and/or the data storage device 260. The data processor 264 may conduct or assist with various processing implemented in the electronic data processing system 120. For example, logic and/or software implementing features and functions of the electronic data processing system 120 may be partially or entirely executed by the data processor 264.

The data processor 264 may be connected to the data bus 262. The data bus 262 may include one or more data buses. The data bus 262 may be any of a variety of data buses or combinations of data buses. One or more components of the control system may be coupled to the data bus 262, such as to facilitate and/or support communication between components. For example, the data processor 264, the data storage device 260 and one or more data ports (268, 270, 272, 274, and 276) are coupled to the data bus 262 to support communications of data between or among the data processor 264, the data storage device 260 and one or more data ports.

The data storage device 260 may store and/or include all or part of the electronic data processing system 120. For example, in FIG. 2, the sensing circuit 124, the analog-to-digital converter 122, the primary processing module 114, the secondary processing module 116, the phase converter 113, the calculation module 110, the dq-axis current generation manager 109, the summer or summation module 119, the current shaping module 106, the rotor magnet temperature estimation module 104, the terminal voltage feedback module 108, the current adjustment module 107, the torque command generation module 105, the current regulation controller 111, and/or the generation module 112 may be included in and/or in communication with the data storage device 260. Fewer or more components may be included with the data storage device 260. Additionally or alternatively, more or less data storage devices 260 may be used for all or part of the electronic data processing system 120.

The data storage device 260 may comprise any magnetic, electronic, or optical device for storing data. For example, the data storage device 260 may comprise an electronic data storage device, an electronic memory, non-volatile electronic random access memory, one or more electronic data registers, data latches, a magnetic disc drive, a hard disc drive, an optical disc drive, or the like.

The data storage device 260 may include a memory. The memory may be a main memory, a static memory, or a dynamic memory. The memory may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory includes a cache or random access memory for the processor. In alternative embodiments, the memory is separate from the processor, such as a cache memory of a processor, the system memory, or other memory. The memory may be an external storage device or database for storing data. Examples include a hard drive, compact disc ("CD"), digital video disc ("DVD"), memory card, memory stick, floppy disc, universal serial bus ("USB") memory device, or any other device operative to store data. The memory is operable to store instructions executable by the processor. The functions, acts or tasks illustrated in the figures or described herein may be performed by the programmed processor executing the instructions stored in the memory. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed herein. The "computer-readable medium" may be non-transitory, and may be tangible.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The data ports 268, 270, 272, 274, and/or 276 may represent inputs, ports, and/or other connections to the data bus 262, data storage device 260, and/or the data processor 264. The data ports 268, 270, 272, 274, and/or 276 of the control system in FIG. 2 may also, or alternatively, be coupled to one or more components of the motor 117, the control system, user interfaces, displays, sensors, converters, and/or other circuits. Each data port may comprise a transceiver and buffer memory, for example. In some systems, each data port may comprise any serial or parallel input/output port.

For example, a controller 266, such as a pedal to a vehicle or other user interface, may be connected, attached, coupled to, and/or in communication with a vehicle data bus 118. The operator of a vehicle may generate the torque commands via a user interface, such as a throttle, a pedal, a controller 266, or other control device. The generated torque commands may be a control data message, such as a speed control data message, a voltage control data message, or a torque control data message. The vehicle data bus 118 may provide data bus messages with torque commands to the torque command generation module 105 via the first data port 268. Various other inputs and/or messages may be received by the torque command generation module 105.

The electronic data processing system 120 may include other input devices configured to allow a user to interact with any of the components of system, such a number pad, a keyboard, or a cursor control device, such as a mouse, or a joystick, touch screen display, remote control or any other device operative to interact with the computer system. In at least this way, the torque command generation module 105 may be associated with or supported by the first data port 268 of the electronic data processing system 120.

Alternatively or additionally, inverter switching circuit 188 may be coupled to the data bus 262 such as, for example, a second data port 270, which may in turn be coupled to the data bus 262. Additionally or alternatively, the sensor 115 and/or the primary processing module 114 may be coupled to a third data port 272, which may in turn be coupled to the data bus 262. Additionally or alternatively, the sensing circuit 124 may be coupled to the analog-to-digital converter 122, which may be coupled to a fourth data port 274. Additionally or alternatively, the terminal voltage feedback module 108 may be coupled to the fifth data port 276, which in turn may be coupled to the data bus 262.

While the data ports are designated first, second, third, etc., no order may be attached to the data ports, and more or less inputs and/or components may be attached to any one data port, and/or one or more data ports may be combined into one data port. The data ports may facilitate providing inputs to the electronic data processing system 120.

Though not shown, the control system and/or electronic data processing system 120 may further include a display unit, such as a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor, or specifically as an interface with the software stored in the memory or in the drive unit.

Additionally, the electronic data processing system 120 and/or control system may also include a disk or optical drive unit. The disk drive unit may include a computer-readable medium in which one or more sets of instructions, e.g. software, can be embedded. Further, the instructions may embody one or more of the methods or logic as described herein. In a particular embodiment, the instructions may reside completely, or at least partially, within the memory and/or within the processor during execution by the computer system. The memory and the processor also may include computer-readable media as discussed above.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The current of the motor 117 may be monitored and/or measured in a number of ways. The measured current magnitude of a motor 117 may rely on and/or depend on one or more factors. For example, a measured current magnitude may rely on a current sensing instant, a current transducer scaling drift, a pulse width modulation switching frequency selection, and/or a PI gain selection.

Proper measurement of the current in the motor 117 may be made easier by, and/or require that, a correct or nearly correct current magnitude measured from the motor 117. In particular, it may be helpful or necessary to calibrate the system so that the current of the motor 117 is measured at a particular instant, also referred to as a current sensing instant. For example, one may wish to ensure that the current of the motor 117 is measured at an averaging or averaged point of a current signal. This may be necessary, for example, to provide an accurate feedback to current regulation controller 111.

As discussed, a generation module 112 and/or inverter switching circuit 188 may generate the voltage command which, in turn, may be sent or transmitted to the motor 117. Where, for example, the generation module 112 is a space-vector pulse width modulation generation module, the voltage command may generate a three phase current which may include a ripple component. As the below equation for an applied machine phase terminal to floating neutral voltage ($v_{an}$) illustrates, the ripple component may be twice the PWM switching frequency:

$$v_{an} = r_s i_s + L(di_a/dt) - \omega_e \lambda_f \sin(\theta)$$

where L is the phase inductance and $\omega_e$ is an electrical frequency, and $\lambda_f$ is a phase back emf. The above equation indicates that the current ripple magnitude may be mainly determined by L (phase inductance) and the PWM switching frequency, which may be inversely proportion to the voltage duration.

One or more factors may arise which may make sensing the current at an averaging point difficult. For example, the control system may experience one or more delays, such as a hardware circuit phase delay, a current samples processing or filtering delay, a current reading delay, and/or a power switches deadtime delay.

If a current sensing instant experiences a delay and/or is not tuned to accurately sense the current of the motor at the right instant, any feedback systems relying on such measurements may be disadvantaged and/or may not operate properly. For example, an incorrect feedback current caused by an improperly timed current sensing instant may lead to a mismatching between a current command and an actual current rms value, which may lead to an unstable control system.

Accordingly, it may be beneficial to calibrate the current sensing instant to account for one or more of the above described delays. For example, one may fine tune and/or otherwise set a current sensing instant based on an operation of the motor 117 in a braking mode and/or a motoring mode.

It should be noted that while a current sensing instant may be described as an instant at which a current signal is sensed, in some systems and methods, the current may be constantly sensed, and the current sensing instant may merely refer to the instant at which the constantly sensed current is latched or otherwise grabbed or obtained and sent for further processing and/or analysis. The current sensing instant may be configured to latch a current value from a set of current signals which may be constantly received such that the current sensing instant corresponds to an averaging point of a rising or falling current slope.

As mentioned, a measured current magnitude of a motor 117 may rely on and/or depend on a current sensing instant, a current transducer scaling drift, a pulse width modulation switching frequency selection, and/or a PI gain selection. Among these, only the current sensing instant demonstrates opposite effects when the motor is operating in a braking mode and a motoring mode.

Figure 3:
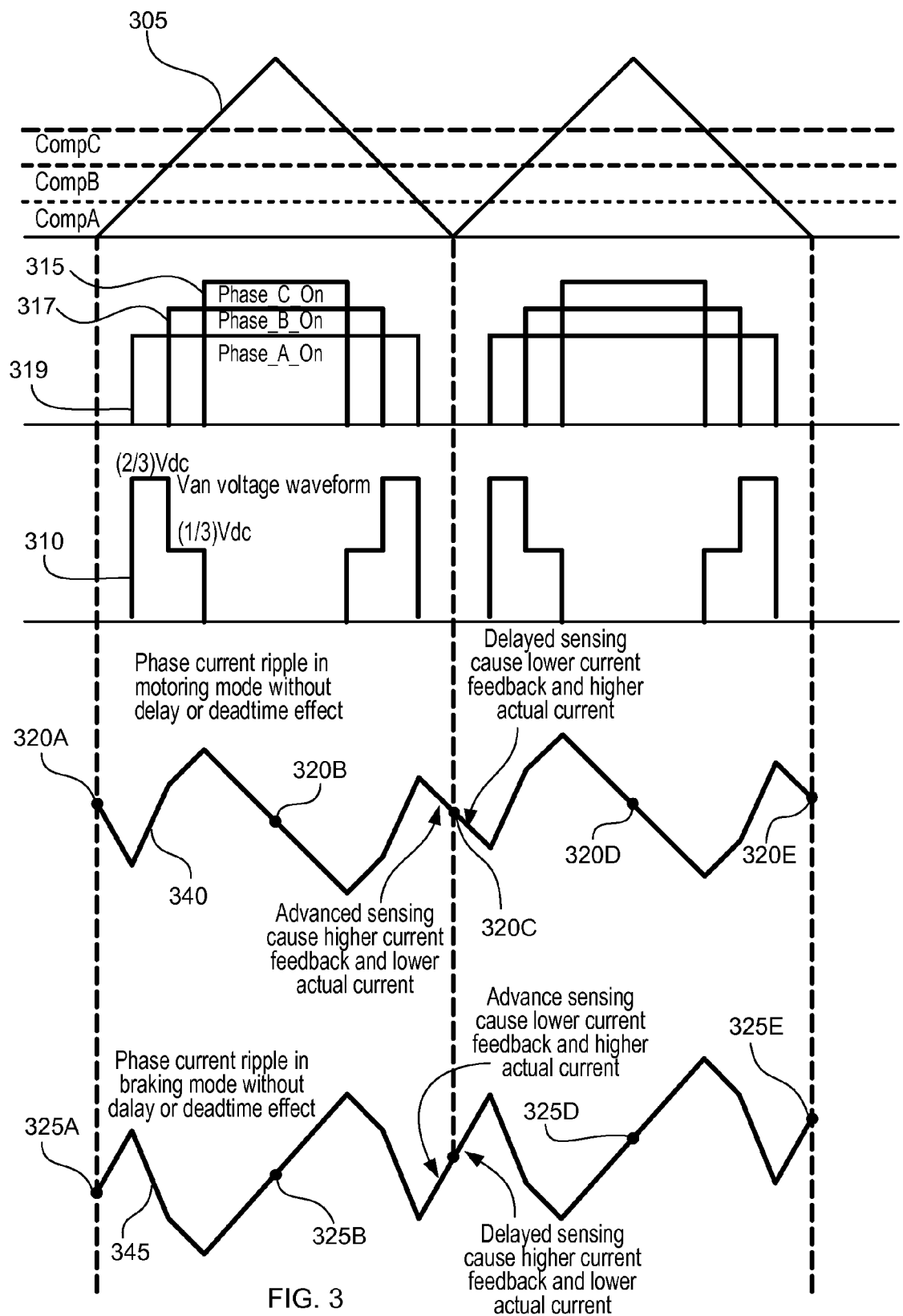
FIG. 3 is a signal diagram in a motoring mode and a braking mode for a motor.

FIG. 3 shows an example signal 305, such as a signal generated by a pulse width modulation generation module 112. The signal 305 may be a base carrier waveform, such as a PWM carrier signal or waveform used by PWM generation modules for phase A, B, and C to generate respective pulse width modulated voltage signals to be sent to three terminals of the motor 117. The generated motor terminal pulse width modulated voltage signals may be represented as signals 315, 317, and 319 respectively. A phase terminal with respect to floating neutral voltage, such as a phase A with respect to floating neutral voltage, may be represented as voltage Van 310, and may be obtained based on voltage signals 315, 317, and 319.

In FIG. 3, the current signal 340 corresponds to an ideal current signal, or current signal experiencing no delay, from the motor 117 when the motor is operating in a motoring mode, where the current signal does not experience any delays. The current signal 345 corresponds to an ideal current signal from the motor 117 when the motor is operating in a braking mode (or generating mode). As mentioned, the frequency of the current signals 340 and 345 is twice that of the PWM carrier signal 305, and contains a ripple effect. Accordingly, it is important to measure the current signal 340 at an averaging point of the current signal, such as averaging points 320A, 320B, 320C, 320D, and 320E. Similarly, it is important to measure the current signal 345 at averaging points 325A, 325B, 325D, and 325E.

However, when a current sensing instant is earlier than the ripple current averaging instant, different effects may be demonstrated in each of the braking mode and the motoring mode. In the motoring mode, a higher magnitude may be measured, which may lead to a higher magnitude in a current feedback system, and a lower magnitude in actual current. In contrast, in the braking mode, a lower magnitude of current may be measured, which may lead to a lower magnitude value in the current feedback system, and a higher magnitude in actual current.

When instead the current sensing instant is later than the ripple current averaging instant, the results are reversed. In the motoring mode, a lower magnitude of current may be measured, which may lead to a lower magnitude in a current feedback system, and a higher magnitude in actual current. In the alternative, in the braking mode, a higher magnitude of current may be measured, which may lead to a higher magnitude value in the current feedback system, and a lower magnitude in actual current.

These features and/or characteristics of the system may provide for a way of calibrating the current sensing instant. The method of FIG. 4 offers one way of calibrating the current sensing instant utilizing these characteristics.

Figure 4:
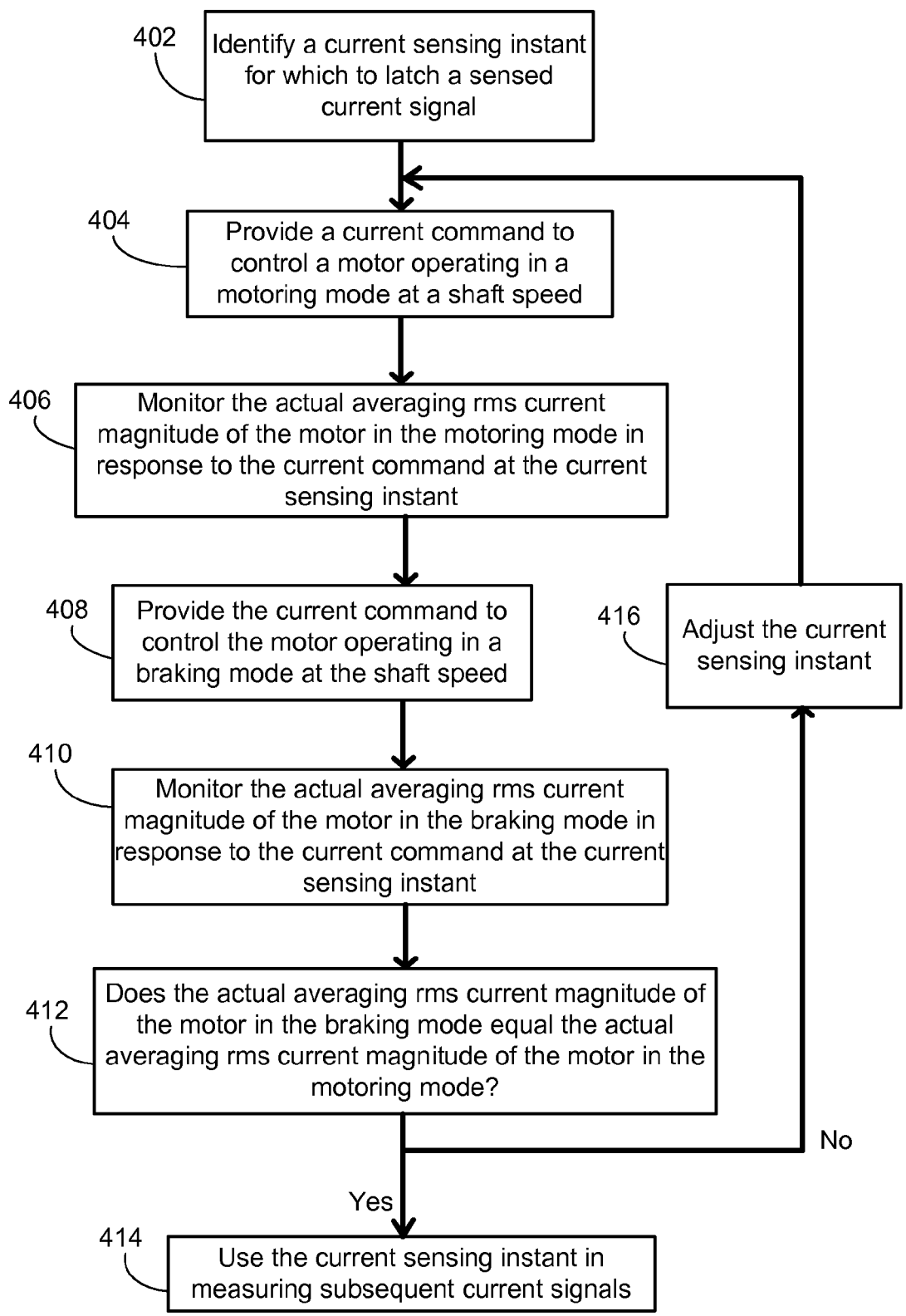
FIG. 4 is a flow chart of a method of calibrating a current sensing instant.

The method of FIG. 4 may begin at block 402, where a current sensing instant for which to latch a sensed current signal may be identified.

In block 404, a current command may be provided to a motor 117 to control the motor 117 while the motor is operating in a motoring mode at a shaft speed. The current command may, for example, be a current command that includes a current magnitude at a Gamma angle. The motor 117 may be operated at a set and/or determined shaft speed.

At block 406, an actual current may be monitored and/or measured from the motor 117 when the motor is controlled by the current command and operates in a motoring mode. For example, an actual averaging rms current magnitude of a three phase motor 117 operating in the motoring mode in response to the current command may be sensed and/or monitored at the current sensing instant identified in block 402. The monitoring and/or measuring may be done as using a power analyzer, oscilloscope, Labview, or other monitoring or measuring devices.

In block 408, one may feed, transmit, and/or otherwise run a matching, same, and/or identical current command. The matching current command may, for example, include the same current magnitude at the same Gamma angle. The matching current command may be sent to the same motor 117 operating in the braking mode at the same shaft speed. In some systems, the braking mode may be an operation of the motor at the same shaft speed but in an opposite rotational direction than the motoring mode.

In block 410, an actual current may be monitored and/or measured from the motor 117 when the motor is controlled by the current command and operates in a braking (or generating) mode. For example, a second actual averaging rms current magnitude of a three phase motor 117 operating in the braking mode in response to the same current command may be sensed and/or monitored at the current sensing instant identified in block 402. The monitoring and/or measuring may be done as using a power analyzer, oscilloscope, Labview, or other monitoring or measuring devices.

While the method of FIG. 4 shows performing blocks 404 and 406 before blocks 408 and 410, one may modify the order of the method to perform blocks 408 and 410 before blocks 404 and 406, or to perform these blocks simultaneously.

In block 412, the measured actual averaging current of the motor 117 in the motoring mode at the current instant may be compared to the measured actual averaging current of the motor 117 in the braking mode at the current instant.

The best, ideal, and/or correct current sensing instant, may be where the measured actual averaging currents of the motor 117 are the same when the motor is in the motoring mode and in the braking mode. Accordingly, when these measured, or observed, actual averaging currents are equal, the method may proceed to block 414, where the current sensing instant may be considered calibrated and/or used throughout subsequent operations of the motor with confidence that the current sensing instant is accurately measuring and/or monitoring the current signal at the proper averaging instant.

If, alternatively, the measured or observed actual averaging currents of the motor 117 are not the same in the motoring mode as in the braking mode, the method may proceed to block 416, where the identified current sensing instant from block 402 may be adjusted. For example, an algorithm, lookup table, and/or rules or logic may compare the differences of the actual measured averaging currents and may determine in which time direction to adjust the current sensing instant. For example, an algorithm may adjust the current sensing instant to measure a later instant where the measured actual averaging current of the motor 117 in the motoring mode is higher than the measured actual averaging current of the motor 117 in the braking mode, and vice versa. This procedure may be referred to as tuning the current sensing instant. In some methods, the current sensing instant may be adjusted for each pulse width modulation cycle. Other methods and/or procedures are possible.

After block 416, the method may return to block 404, and proceed again through the method of FIG. 4 until block 412 is again reached. If at block 412 the measured actual currents of the motor 117 in motoring mode and in braking mode are equal, the method proceeds to block 414, and if not, the method returns to block 416 and the process repeats.

A modified version of the method of FIG. 4 may ignore blocks 402 and 416. In this modified version, the method may be begin by running a command through the motor 117 in a motoring mode, and continuously sensing the current from the motor 117. Similarly, the motor may be commanded by the same command, while operating at the same shaft speed, while the motor 117 operates in a braking mode. The current may be continuously sensed during this operation as well. In this modified version of the method, block 412 may be replaced by a block of calculating the current sensing instant based on the entire current sensed for each mode. For example, one may compare the two sensed current signals and identify an instant at which the values of the sensed current signals are equal. This may then be identified at block 412 as the current sensing instant.

The blocks of FIG. 4 may all, or partially, be carried out by a processor, such as data processor 264, by either the primary processing module 114 or the secondary processing module 116, or any other internal or external processor or modules. Alternatively or in addition, an external routine and diagnostic calibration module or system may be implemented for calculating and/or calibrating the current sensing instant.

In at least this way, by comparing the actual averaging current of the motor 117 in the motoring mode with the actual averaging current of the motor 117 in the braking mode, one may determine the points at which the actual averaging currents are equal. The current sensing instant may then be identified and/or configured, so that current is sensed and/or latched at precisely those points.

Additionally or alternatively, one may calibrate a correct current sensing instant in other ways. In some methods, one may calculate an amount of correction for each of the hardware phase delay, current samples processing delay, current reading delay and deadtime current phase delays individually. An example of a method similar to this is shown in FIG. 5.

Figure 5:
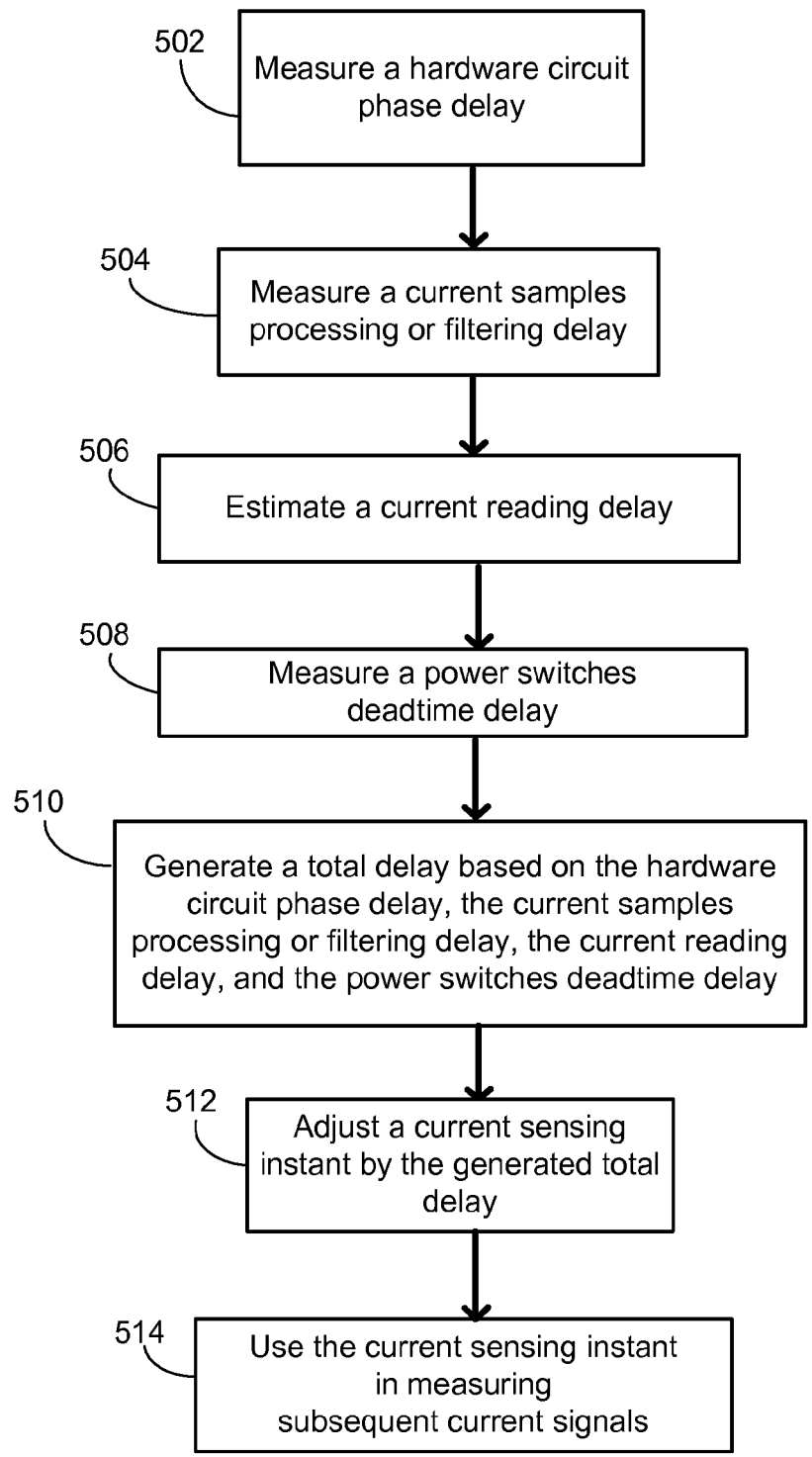
FIG. 5 is a flow chart of a method of calibrating a current sensing instant.

The method of FIG. 5 may begin at block 502, where a hardware circuit phase delay may be measured.

As mentioned, the control system may experience a hardware delay. A hardware delay may, for example, result from and/or be associated with a current transducer attached to or otherwise coupled with the motor 117. Alternatively or in addition, hardware delays may result from the use of one or more filters, such as a low-pass anti-aliasing filter, and/or operational amplifiers, such as those used to adjust analog signal scaling and offset. Alternatively or in addition, hardware delays may result from the use of an analog-to-digital converter, which may have and/or cause sampling and/or hold delays.

Hardware delays from a filter, such as a low-pass anti-aliasing filter, operational amplifiers, and an analog-to-digital converter may not require extensive testing, but instead may be easy to calculate and/or estimate by analytical analysis. In circumstances where a hardware delay is due to the current transducer, phase delay may not be explicit from a manufacturer's product sheet, and as a result, may need to be manually tested for, calibrated, and/or determined.

Any hardware circuit phase delay may be measured in many ways. For example, in one way, a pair of measuring devices, and/or a measuring device with two ports, may be used. One measuring device may be connected to the motor and/or receive the signal immediately output from the motor 117, and the second measuring device may be connected to and/or receive the signal from the motor 117 after it has passed through the hardware circuitry of the system, and/or right before it is received by a field programmable gate array, such as field programmable gate array 870 discussed below, or other digital storage and computing device, such as a complex programmable logic device (CPLD) or other device. Both of the signals may be displayed, and/or compared to each other, and a delay in the second signal may be easily measured and/or calculated based on the comparison. Other methods of measuring this delay may be possible.

At block 504, a current samples processing or filtering delay may be measured. The control system may experience delays associated with processing current sample. Current samples processing delays may result, for example, from digital filters on samples, such as an FIR filter in a field programmable gate array which may be used to remove noise in the current signal. In some circumstances, this delay can be explicitly calculated based on filter design parameters and/or using software or other logic to account for any delays. This delay may, for example, be a software delay. Delays resulting from scaling and/or offsetting a sampled digital current may not be likely to cause any negligible delay.

This current sample processing or filtering delay may be precisely derived mathematical equations carried out by the software and/or the field programmable gate array or other type of digital storage and/or computing device. This delay may be a constant in some systems. Other methods of calculation or estimation may be possible.

At block 506, the current reading delay may be estimated or calculated. A control system may experience delays associated with reading a current. Current reading delay may be caused by and/or result from, for example, controllers or other components, such as when current samples are commanded to be read into the current regulation controller 111 for current-position synchronization and/or transformation. For example, transferring a signal between a field programmable gate array and a digital signal processor, such as the field programmable gate array 870 and the digital signal processor 850 discussed below with respect to FIG. 8, may be accomplished using a parallel bus between these components connecting them, and there may be a delay associated with sending signal from one to the other. In some systems, only the latest current samples may be read by the current regulation controller 111. As such, these delays may have a small varying time delay and/or small averaging effects to be considered. In some systems, when a current reading command reading arrives, the latest current samples may just be available or have been available for one or a few clock cycles, depending on how fast raw currents were sampled.

Because determining an exact current reading delay may be difficult and/or resource prohibitive, and/or because the current reading delay may be fairly accurately estimated, the block 506 may merely estimate this delay. Compared with the other delays, this delay may be rather small. Estimating of this delay may, for example, depend on the sampling clock cycle of the current signal. For example, a current reading could be instant, or could be delayed by a sampling cycle, and this reading may depend on the sampling clock. An average of this delay may be, for example, one half of a sampling cycle.

At block 508, a power switches deadtime delay may be measured. The control system may experience delays associated with power switching deadtime. When pulse width modulation generation module reaches a compare value, insulated-gate bipolar transistor (IGBT) switches may not be able to turn on or off immediately due to the deadtime protection. Neglecting the deadtime effect, a pulse width modulation zero counter instant would exactly correspond to the averaging instant of the actual current ripple waveform of the motor 117. However, the deadtime effect may not be negligible. Accordingly, the averaging instant of actual current ripple may have a time delay from a PWM zero counter instant, such as around half of the deadtime duration, which may require adjusting the averaging current sensing instant.

The deadtime may be set, for example by hardware or software, such as the IGBT controller, to a very precise delay. The deadtime delay may be measured, or may simply be identified from the setting hardware and/or software. For example, the deadtime delay average may be half of the deadtime set by the hardware and/or software.

While blocks 502, 504, 506, and 508 are shown in FIG. 5 as being performed in that order, in other methods, any of these blocks may be performed in any order.

At block 510, a total delay may be calculated and/or generated. The total delay may be calculated, for example, by adding together the measured delays from blocks 502, 504, and 508 with the estimated delay of block 506. This may be done, for example, by a processor such as data processor 264, by either the primary processing module 114 or the secondary processing module 116, or any other internal or external processor or modules. Other methods of obtaining the total delay may be possible.

At block 512, a current sensing instant may be adjusted to account for the calculated total delay. For example, a current sensing instant may be set to occur at an instant which may occur a time length after the start of a PWM cycle for the generating signal to the motor 117, where the time length may equal the total delay. In this way, the current sensing instant may be set to appropriately correct for and/or account for each delay that the control system may face.

At block 514, the current sensing instant may then be used, as in block 414 of FIG. 4, to properly measure subsequent current sensing instants from current signals generated by the motor 117.

Because it may be difficult, cost prohibitive, and/or resource intensive to perfectly set the current sensing instant, some deviation from the ideal and/or best current sensing instant may be allowable. For example, a delay or advancement on the order of 1 micro-second may be acceptable. Other values and/or delays may be acceptable. Additionally, it may be helpful to put a proper offset to current transducer readings prior to calibrating for the current sensing instant, which may remove any offset error in the current sensing.

Once the current sensing instant is tuned for a specific inverter design, it may not change much with respect to hardware component parameter drifting. Additionally, even where non-synchronization of current sensing and position sensing exists, such as where a generated torque deviates from a desired value due to an incorrect dq-axis used in a current regulation controller 111, this may not directly affect current regulation magnitudes, so long as the current sensing instant is properly tuned. Accordingly, in some systems, the current sensing instant may be tuned once, with the tuning being carried out prior to full blown operation of the control system.

In addition to determining a proper current sensing instant, the proper functioning of a control system in FIG. 1 may also require proper calibration of current transducers (CTs) used in measuring the current of a motor 117. In particular, it may be beneficial to calibrate one or more CT scaling ratios, which may also be referred to as CT scaling ratios.

The CT scaling coefficients may, for example, be stored in a look up table, which may be used to apply the coefficients to a signal from a current transducer. Such coefficients may be used, for example, to account for various effects of the system, such as a temperature and current magnitude, which may otherwise cause inaccurate current signals and/or readings.

A CT scaling coefficient may not be constant, but may rather vary with, for example, a current magnitude. Accordingly, one may calibrate a CT using CT scaling coefficients for various current magnitudes, which may be referred to when an actual current magnitude is measured by the current transducer.

There may be one or more ways to calibrate a current transducer. For example, one may calibrate a current transducer using a direct current (DC) current calibration, and/or may calibrate a current transducer using an alternating current (AC) current calibration. In other examples, one may calibrate a current transducer using a DC current calibration, and then may verify the calibration using an AC current calibration.

Figure 6:
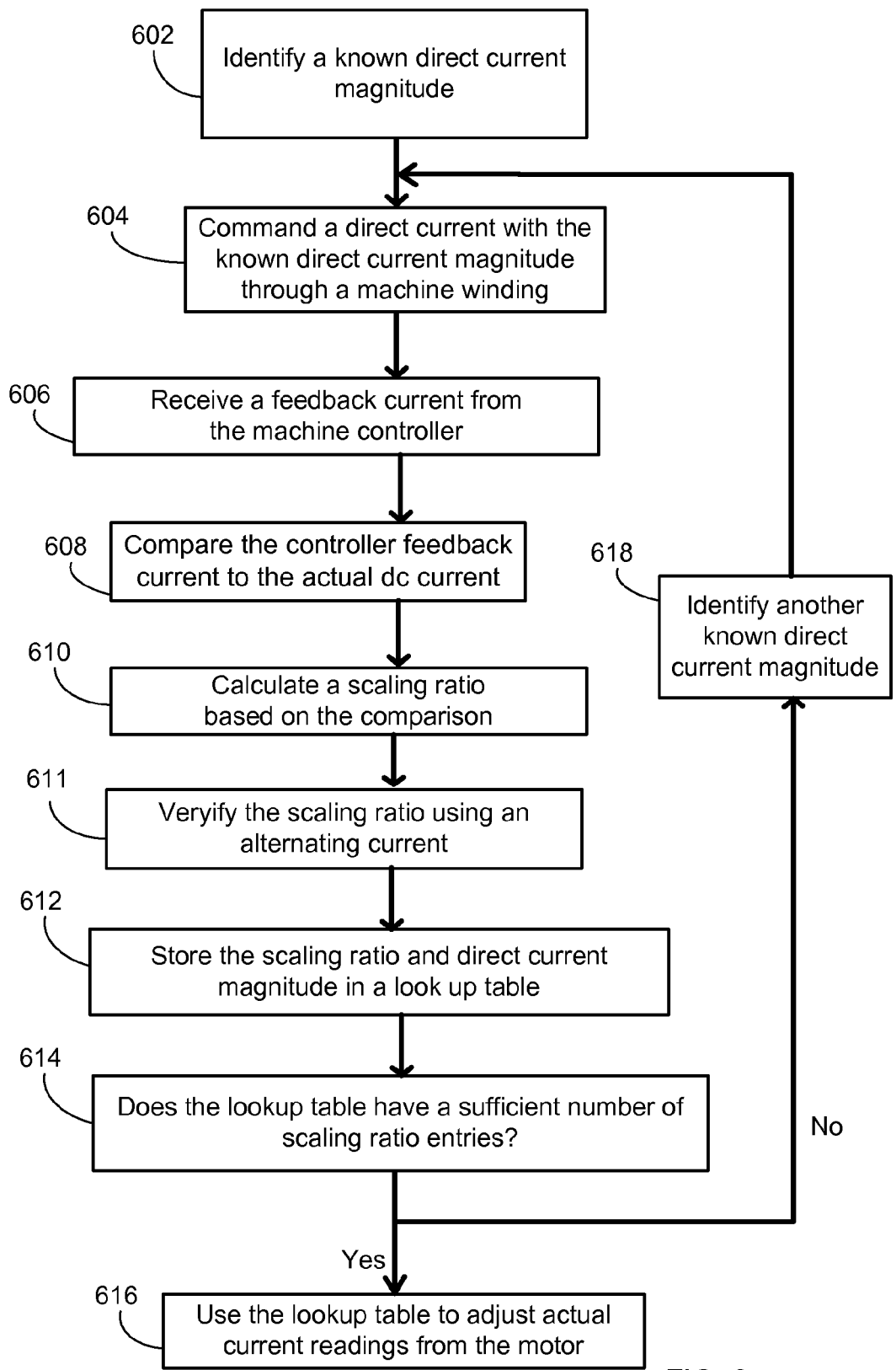
FIG. 6 is a flow chart of a method of generating a lookup table with scaling coefficients.

For example, FIG. 6 shows one method of calculating scaling coefficients (or scaling ratios) useful for calibrating current transducers and/or adjusting measured current signals and/or current commands for proper operation and/or control of a motor 117.

The method of FIG. 6 begins at block 602, where a known DC current magnitude may be identified. For the DC current calibration, a direct current (dc) power supply may be attached, connected, coupled, and/or in communication with the motor 117 and/or the control system. In some systems, the dc power supply may have a high current limiting capability, such as up to or exceeding 500 amps (A). Other power supplies may be used.

In block 604, the DC current from the dc power supply may be commanded through the motor 117 and/or machine windings.

At block 606, an actual (feedback) current may be measured from the motor 117, such as using a high performance Danfysic current transducer measurement or using a shunt resistor to measure the actual dc current.

At block 608, the inverter or controller feedback current may be compared to the actual DC current that was supplied from the dc power supply.

As a result of the comparison in block 608, at block 610, a scaling coefficient or scaling ratio may be derived and/or calculated. The scaling coefficient may correspond to the magnitude of the actual measured DC current supplied from the dc power supply and run through the motor 117. For example, a scaling coefficient may be the magnitude of the known DC current over the actual feedback current received, or may be the inverse of this.

In some methods, the known DC current may also be run through the machine and/or motor 117 in an opposite direction. In some systems, another scaling ratio may be calculated in the opposite direction as well. The scaling ratio for the given DC current and/or measured current may then be calculated by taking the average of the scaling ratios. In some of these systems and methods, some or all of the blocks of the method in FIG. 6 may be repeated separately, after the method is completed for all currents in a first direction, or may be completed for each DC current immediately after the scaling coefficient is determined for the specified DC current.

In block 611, the scaling coefficient generated in block 610 may be verified using an alternating current calibration. For example, a specific current magnitude at a Gamma angle, such as a moderate Gamma angle of 45 degrees, may be commanded through the motor 117, an actual average three phase current from the motor 117 may be received, and the actual average three phase current may be compared to the commanded specific current. Block 611 may also or alternatively be conducted in a manner consistent with the AC current calibration procedure identified below.

Block 611 may be repeated at a plurality of shaft speeds and/or with different electrical frequencies. Block 611 may be optional. Alternatively, the verifying block 611 may take place after block 614 of this method, as described below.

In block 612, the scaling coefficient may be stored in a look up table. The lookup table may be a part of, in communication with, connected to, attached to, and/or otherwise linked with the electronic data processing system 120, a data processor such as data processor 264, and/or various components of the control system, such as the primary processing module 114, the secondary processing module 116, or other components. The stored scaling coefficient may also be associated with and/or affiliated with the DC current magnitude of the current commanded through the motor 117 or machine winding.

In block 614, the method may look to see where the lookup table has a sufficient number of scaling coefficient entries. For example, the lookup table may require a certain number of entries, or may require an entry for every interval of current, such as for every additional amp of DC current. In other methods, this block may be manually performed, and/or may be eliminated. In some of these methods, block 602 may rather include a full list of known DC current magnitudes which may require a scaling ratio calculation, and block 612 may instead simply check the list to see if all of the scaling ratios have been calculated.

If more calculations are necessary, the method may move to block 618 where another known DC current magnitude may be used to calculate the scaling coefficient for, by moving to block 604 of the method.

The above-described DC current scaling process may be repeated one or more times, using one or more different known DC currents. Scaling coefficients may be collected for each of the different known DC currents and/or measured currents from the motor 117.

The scaling coefficients may be saved and/or input into a table, such as a lookup table. The lookup table may be stored in and/or accessed by the electronic data processing system 120 of FIGS. 1 and 2, the data storage device 260, the data processor 264, and/or other components of the control system.

The method of FIG. 6 may be conducted prior to operation of the motor 117 in any commercial and/or designated tasks. If the lookup table is complete, the method may move to block 616, where the lookup table may be used. The lookup table may be used, for example, by receiving an actual measured current from the motor 117 or checking the current command applied to the motor 117, and applying the scaling ratio and/or scaling coefficient from the lookup table to the actual measured current, obtaining an adjusted current. Other uses are possible.

The tables, data, and/or lookup tables may subsequently be accessed at any time the motor 117 is in operation. The data in the lookup tables may be used to scale a reading from the designated CT, and/or may be used to alter an input into the motor 117 based on the data in the lookup tables.

These processes may be carried out for each of the current transducers used with the control system and/or motor 117. For example, where the motor 117 is a three phase motor, three current transducers may be included with the motor 117. Each of the current transducers may include a table and/or scaling data and ratios, which may subsequently be relied upon to properly scale data to or from the current transducer. The calculated scaling ratios may be calibrated separately and stored for each phase of the three phase motor. This DC current calibration procedure may be sufficient to properly determine and supply scaling data for a current transducer.

As mentioned, verifying the scaling ratios in the lookup table using an AC current calibration, shown in block 611, may also be done after block 614.

An AC current calibration may utilize and/or require a prime mover. The prime mover may maintain a constant shaft speed, such as a machine base speed. A known current command, which may have a current magnitude at a Gamma angle, may then be supplied to the motor 117. The Gamma angle may, for example, be 45 degrees.

The actual averaged three phase currents of the motor 117 may be monitored, sensed, and/or otherwise observed. The observed current may be compared with the commanded value. A scaling coefficient or scaling ratio may be obtained, identified, calculated, and/or determined from the comparison. The scaling coefficient may be compared to the DC current calibration scaling ratio where the AC current calibration is used as a verification process. The AC current calibration may simultaneously adjust a CT scaling coefficient for all three current transducers simultaneously, rather than any one particular CT scaling coefficient for one of the current transducers. Additionally, in some systems, it may be useful to ensure that a proper pulse width modulation switching frequency and/or PI gain is carefully tuned to achieve a sufficiently small unbalance percentage prior to performing the AC current calibration.

As mentioned, the CT scaling coefficients may be stored in a table, such as a lookup table. Upon subsequent three phase current feedback readings, such as those current feedback signals sent from the analog-to-digital converter 122 to the secondary processing module 116, the current feedback readings may be adjusted by and/or multiplied by the CT scaling coefficient. This may be best where the three phase current transducers have close scaling coefficients versus magnitudes.

Figure 7:
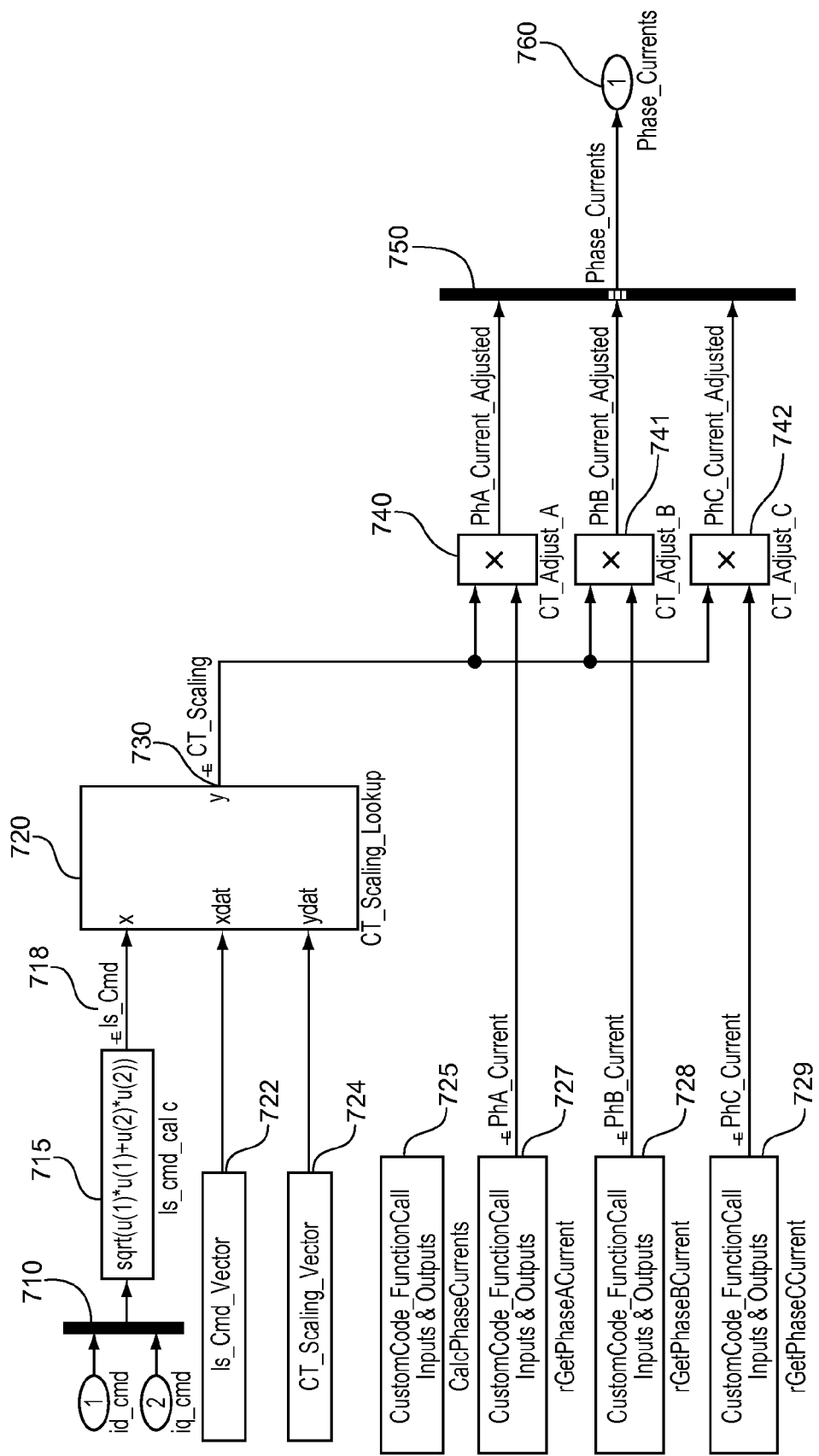
FIG. 7 is a circuit diagram of a portion of a control system for controlling a motor.

An example of the use of the CT lookup table is shown in the circuit drawing in FIG. 7. In FIG. 7, a d-axis current command and a q-axis current command may be combined at block 710, using the equation in block 715 to achieve a total current command input 718 to a CT scaling lookup table 720. The equation in block 715 may be:

$$i^* = \text{square root}((i_d^*)^2 + (i_q^*)^2)$$

In addition, the CT scaling lookup table 720 may also receive as inputs a current command vector 722 and a CT scaling vector 724. These vectors 722 and 724 which may include the information regarding the CT scaling coefficient as they relate to various known DC current magnitudes. For example, vector 722 may store known DC current magnitudes during a dc current calibration procedure, and/or vector 734 may store corresponding calculated scaling ratios at each dc current magnitude. Other configurations are possible.

A current transducer scaling coefficient 730 may be output from the CT scaling lookup table 720 based on the input current command 718. For example, the current input into the CT scaling lookup table 720 may be compared with information in the lookup table, and an appropriate CT scaling coefficient may be selected based on the current command magnitude.

A phase current calculation block 725 may be used to calculate the three phases current from the motor 117 after proper filtering, processing etc. For example, the phase calculation block 725 may be implemented in and/or comprise the secondary processing module 116 in FIG. 1.

Each of the three phases of current, identified as phase A current 727, phase B current 728, and phase C current 729 may then be multiplied by the CT scaling coefficient 730. For example, the phase A current 727 may be multiplied by the CT scaling coefficient 730 at multiplication block 740; phase B current 728 may be multiplied by the CT scaling coefficient 730 at multiplication block 741; and phase C current 729 may be multiplied by the CT scaling coefficient 730 at multiplication block 742. The results may be output individually and/or combined at block 750 to obtain an output 760.

While FIG. 7 shows one lookup table for all three phases of a three phase current, in some other systems each of the phases and/or current transducers may have different lookup tables. For example, the CT lookup table 720 may only be used to multiply and/or adjust the current for a phase A current 727 at multiplication block 740, while a second CT lookup table (not shown) may be used to multiply and/or adjust the current for the phase B current, etc. If the CT scaling lookup tables are stored in boot book or EEPROM, they may be loaded into a controller for easy comparison.

Where a current sensing instant has been properly tuned, the above described DC/AC current calibration procedure may achieve very accurate current regulation magnitudes, such as within 1% error. This may be possible through a whole speed range and at various current or torque levels.

Figure 8:
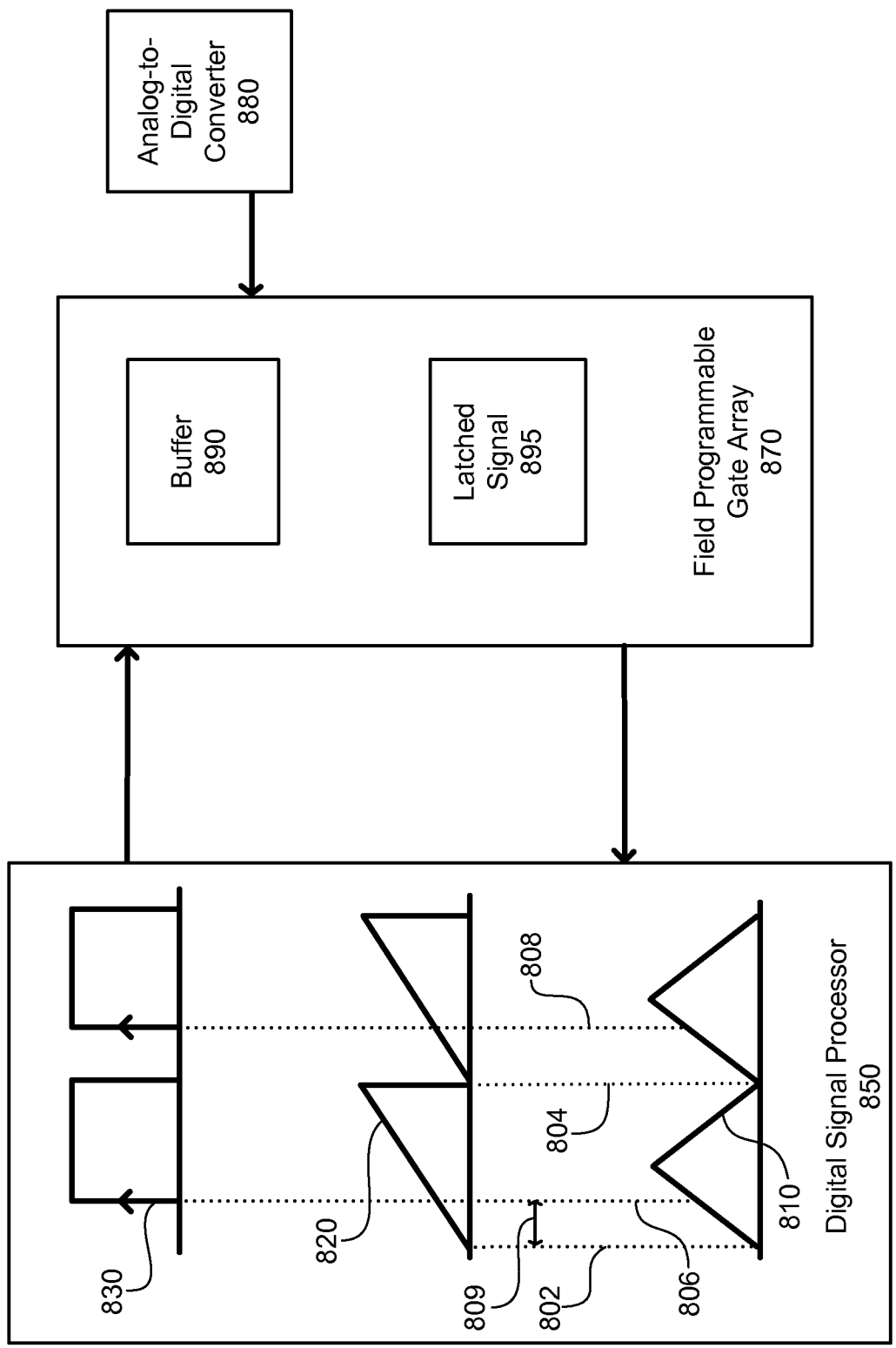
FIG. 8 is a block diagram of a portion of a control system for controlling a motor.

FIG. 8 illustrates an example of the operation of some current sensing components in the control system, after the current sensing instant and/or CT scaling ratios have been calibrated.

A field programmable gate array 870 may be attached, connected, coupled, and/or in communication with an external analog-to-digital converter 880 used for sensing a current from the motor 117. The external analog-to-digital converter 880 may be the analog-to-digital converter 122 or another analog-to-digital converter. The external analog-to-digital converter 880 may continuously sense a current signal and may produce a continuous stream or set of digital samples and/or signals from the sensed current signal, which may be sent to the field programmable gate array 870. For example, a sampling speed for the external analog-to-digital converter may produce a new sample every 1-2 microseconds. While the analog-to-digital converter 880 is shown in FIG. 8 as being external, the field programmable gate array 870 may have an internal analog-to-digital converter instead.

It should be appreciated that while reference is made herein to a field programmable gate array 870, this component may, in some systems, be another type of digital storage and/or computing device, such as a complex programmable logic device (CPLD).

The field programmable gate array 870 may continuously receive digital current samples from the external analog-to-digital converter 880. The field programmable gate array 870 may, for example, include a buffer 890 which may be used to store the digital current samples received from the analog-to-digital converter 880.

In addition or alternatively, the field programmable gate array 870 may include one or more filters. For example, the field programmable gate array 870 may have an FIR filter which may be used to filter out noise from the received current signal.

A digital signal processor 850 may be attached, connected, coupled, and/or in communication with the field programmable gate array 870. The digital signal processor 850 may, for example, access and/or store data related to the calibrated current sensing instant. For example, the digital signal processor 850 may have data related to delays and/or current signals, and/or may monitor a PWM carrier signal generated by a generation module 112, such as signal 810.

In accordance with the received PWM carrier signal from the generation module 112, as well as the data about the current sensing instant, the digital signal processor 850 may calculate, estimate, identify, and/or otherwise determine the proper instant at which the received current signal should be sampled. The proper instant may be shown as dotted line 806, and dotted line 808 in the digital signal processor 850. In accordance with this determination, the digital signal processor may generate and/or transmit a digital pulse 830 to the field programmable gate array 870. The digital pulse 830 may indicate a current sensing instant at which to latch a current value from a sensed current signal. The digital pulse 830 may be a rising edge triggered digital pulse, and/or may represent the best and/or calibrated current sensing instant. A rising or falling edge of the digital pulse 830 may be configured to correspond to an averaging point of the sensed current signal. The digital pulse 830 may be configured to provide a cue or to latch a current value from the set of current signals such that it corresponds to an averaging point of a rising or falling current slope.

The digital signal processor 850 may generate the digital pulse 830 in a number of ways. For example, the digital signal processor 850 may include and/or use as many as six PWM modules or generators. In some digital signal processors 850, three of these PWM generators may be used to generate a voltage signal or pulse to be sent to the motor 117, such as a phase A, phase B, and phase C voltage signals. The signal 810 may, for example, represent the combination of the three PWM carrier signals generated by these three PWM generators.

In addition or alternatively, a spare PWM generation module to generate an up-count carrier signal, such as pulse 820. In some systems, it is also possible to use other spare DSP components, such as an enhanced capture (eCap) module, to generate the digital pulse 820. The up-count carrier signal may have a cycle which may start, for example, at a zero-point, low point, or period point corresponding to the three-phase generation signal 810, as indicated by the dotted lines 802 and 804 in FIG. 8. The spare PWM module carrier signal 820 may be synchronized with the three other PWM modules generating carrier signals 810 for phases A, B, and C. The current sensing instant may be calculated and/or stored in the digital signal processor 850 in a number of ways. For example, the digital signal processor 850 may be configured so that a digital pulse 830 may be generated a designated count, or time, after the start of the up-count pulse 820. The time may be represented, for example, by the delay 809. By adjusting the delay 809 between the start of the up-count carrier signal 820 and the current sensing instant, the digital signal processor may be easily calibrated to properly generate the digital pulse 830 corresponding to the best current sensing instant.

Upon receiving the transmitted digital pulse 830 from the digital signal processor 850, the field programmable gate array 870 may latch, catalogue, document, and/or otherwise identify the three phase current sent from the external analog-to-digital converter at that instant. In particular, the field programmable gate array 870 may be configured to latch a set of three phase current values from the continuously sensed and filtered current signal at the current sensing instant indicated by the rising or falling edge of the digital pulse. The latched three phase current value set may, for example, be the most recent set of phase current values in the buffer of the field programmable gate array 870 at the instant the digital pulse 830 is received.

This latched three phase current signal 895 may then be sent, transmitted, fed, and/or otherwise sent to the digital signal processor 850. The digital signal processor 850 may process the received three phase current signal 895. For example, the digital signal processor 850 may perform a Park transformation or other phase transformation on the received three phase signal, and may generate a d-axis current signal and a q-axis current signal as a result. After performing the transformation, the digital signal processor 850 may send, feed, transmit, and/or otherwise output the resulting two-phase current signal, such as to the current regulation controller 111.

Alternatively, the transformation of the signal may be performed in and/or by the field programmable gate array 870.

While FIG. 8 shows one external analog-to-digital converter 880, more may be present. For example, the control system may use three external analog-to-digital converters, with each one being directed to one of the phases of the three phase current. In systems like this, the field programmable gate array 870 may latch one phase of the three phase sensed currents from the stored digital current samples received from each of the external analog-to-digital converters. Other configurations are possible.

In some systems, one or both of the field programmable gate array 870 and the digital signal processor 850 may be components of the secondary processing module 116. In other systems, one or both of the field programmable gate array 870 and the digital signal processor 850 may be components of the electronic data processing system 120. In other systems, other configurations may be possible.

Having described the preferred embodiment, it will become apparent that various modifications can be made without departing from the scope of the invention as defined in the accompanying claims.

We claim:

1. A method of calibrating a current sensing instant to latch a current value from a set of current signals comprising:
   providing a current command including a magnitude at a Gamma angle to control a motor when the motor is operating in a motoring mode at a shaft speed;
   providing a matching current command including a same magnitude at a same Gamma angle to control the motor when the motor is operating in a braking mode at a same shaft speed;
   monitoring, when the motor is controlled by the current command and operating in the motoring mode, a first actual averaging rms current magnitude of three phase currents of the motor;
   monitoring, when the motor is controlled by the matching current command and operating in the braking mode, a second actual averaging rms current magnitude of the three phase currents of the motor;
   adjusting a current sensing instant until an observed first actual averaging rms current magnitude in the motoring mode equals an observed second actual averaging rms current magnitude in the braking mode.

2. The method of claim 1, wherein an actual averaging rms current magnitude of three phase currents of the motor is continuously sensed.

3. The method of claim 2, wherein the current sensing instant is adjusted for each pulse width modulation cycle.

4. The method of claim 1, wherein the motoring mode represents a mode of operation where the motor is receiving power from a power source, and the braking mode represents a mode of operation where the motor is supplying power to the power source.

5. The method of claim 1, wherein the current sensing instant is configured to latch a current value from the set of current signals such that it corresponds to an averaging point of a rising or falling current slope.

6. A system for processing a sensed current signal from a motor, the system comprising:
   a digital signal processor;
   a field programmable gate array in communication with the digital signal processor;
   the digital signal processor being configured to generate a digital pulse indicating a current sensing instant at which to latch a current value from a sensed current signal from a motor, a rising or falling edge of the digital pulse being configured to correspond to an averaging point of the sensed current signal;
   the field programmable gate array being configured to receive a continuously sensed three phase current signal from a motor and the digital pulse from the digital signal processor, the field programmable gate array configured to latch a set of three phase current values from the continuously sensed current signal at the current sensing instant indicated by the rising or falling edge of the digital pulse, and transmit the latched three phase current values to the digital signal processor.

7. The system of claim 6, wherein the digital signal processor is configured to perform a Park transformation on the received latched three phase current value to generate a d-axis current signal and a q-axis current signal.

8. The system of claim 7, further comprising a current regulation controller configured to receive the d-axis current signal and the q-axis current signal from the digital signal processor.

9. The system of claim 6, wherein the digital signal processor comprises a pulse width modulation generator dedicated to generating the digital pulse.

10. The system of claim 6, wherein the field programmable gate array receives the continuously sensed three phase current signal from either an external analog-to-digital converter and sensing circuit, or from an internal analog-to-digital converter and sensing circuit.

11. The system of claim 6, wherein the field programmable gate array includes a filter which filters the continuously sensed three phase current signal.

12. A method of calibrating inverter current transducers for a machine controller, the method comprising:
   commanding a known DC current through a machine winding;
   receiving a feedback current from the machine controller;
   comparing the feedback current to the known DC current;
   calculating a scaling ratio based on the comparison;
   repeating the steps of commanding, receiving, comparing, and calculating a plurality of times, each time using a different known DC current magnitude;
   generating a lookup table comprising the calculated scaling ratios for the known DC current magnitudes;
   wherein the known DC current is commanded through the machine winding in a first direction;
   commanding the known DC current through the machine winding in a second direction opposite the first direction;
   receiving a second feedback current from the machine controller;
   comparing the second feedback current to the known DC current; and
   calculating a second scaling ratio based on the comparison.

13. The method of claim 12, wherein the calculated scaling ratios are calibrated separately and stored for each phase of the three-phase motor.

14. The method of claim 12, wherein the steps of commanding, receiving, comparing, calculating, repeating, and generating are preformed prior to a designated operation of the machine, and wherein during the designated operation of the machine, a measured current magnitude of the machine is adjusted by a corresponding scaling ratio stored in the lookup table.

15. A method of calibrating inverter current transducers for a machine controller, the method comprising:
   commanding a known DC current through a machine winding;
   receiving a feedback current from the machine controller;
   comparing the feedback current to the known DC current;
   calculating a scaling ratio based on the comparison;
   repeating the steps of commanding, receiving, comparing, and calculating a plurality of times, each time using a different known DC current magnitude;
   generating a lookup table comprising the calculated scaling ratios for the known DC current magnitudes;
   verifying the scaling ratio using AC current; and
   wherein verifying the scaling ratio comprises commanding a specific current magnitude at a moderate Gamma angle through machine, receiving an actual average three phase current from the machine, and comparing the actual average three phase current to the commanded specific current magnitude.

16. The method of claim 15, further comprising repeating the step of verifying at a plurality of shaft speeds with different electrical frequencies.

17. A method performed by a processor of calculating a time delay associated with receiving and processing a current signal, the method comprising:
- measuring a hardware circuit phase delay by the processor;
- measuring a current samples processing or filtering delay by the processor;
- estimating a current reading delay by the processor;
- measuring a power switches deadtime delay by the processor; and
- adjusting by the processor a current sensing instant used to latch a current value from a continuously sensed current signal buffer, the adjustment based on a total delay from the measured hardware phase delay, the measured current samples processing delay, the estimated current reading delay, and the measured power switches deadtime delay.

18. The method of claim 17, wherein the current reading delay includes delays from reading current samples from an analog-to-digital converter to a field programmable gate array, and delays from transmitting latched current values from a field programmable gate array to a digital signal processor through a parallel bus.

19. The method of claim 18, wherein the current reading delay is estimated based on a sampling clock cycle of the current signal.

20. The method of claim 17, wherein the hardware delay results from at least one of a current transducer coupled to a motor, a low-pass anti-aliasing filter, an operational amplifier for analog signal offset and scaling adjustment, or an analog-to-digital converter delay.

21. The method of claim 20, wherein the hardware delay is determined by comparing a first signal directly outputted by a motor to a second signal outputted by the motor and received immediately prior to being transmitted to a field programmable gate array.

22. The method of claim 17, wherein the current samples processing delay includes a phase delay from digital filtering of a series of sampled current signals.

23. The method of claim 17, wherein the power switches deadtime delay is measured based on a deadtime of a power switch.

* * * * *